US011875646B2

(12) United States Patent
Higgins et al.

(10) Patent No.: US 11,875,646 B2
(45) Date of Patent: Jan. 16, 2024

(54) SYSTEM, METHOD, AND DEVICE FOR BACK-BETTING PROGRESSIVE PRIZE POOLS IN A GAMING SYSTEM

(71) Applicant: IGT, Las Vegas, NV (US)

(72) Inventors: Kevin Higgins, Reno, NV (US); Christopher Levin, Reno, NV (US); Jeffery Shepherd, Reno, NV (US)

(73) Assignee: IGT, Las Vegas, NV (US)

( * ) Notice: Subject to any disclaimer, the term of this patent is extended or adjusted under 35 U.S.C. 154(b) by 55 days.

(21) Appl. No.: 17/345,262

(22) Filed: Jun. 11, 2021

(65) Prior Publication Data

US 2021/0304569 A1 Sep. 30, 2021

Related U.S. Application Data

(62) Division of application No. 16/216,140, filed on Dec. 11, 2018, now Pat. No. 11,037,408.

(51) Int. Cl.
*G07F 17/32* (2006.01)

(52) U.S. Cl.
CPC ...... *G07F 17/3288* (2013.01); *G07F 17/3223* (2013.01); *G07F 17/3244* (2013.01); *G07F 17/3295* (2013.01)

(58) Field of Classification Search
CPC .... G07F 17/32; G07F 17/3288; G07F 17/326; G07F 17/3262; G07F 17/3218; G07F 17/3204; G07F 17/3272; G07F 17/3223; G07F 17/3244; G07F 17/3295
USPC ............................................... 463/20, 25, 29
See application file for complete search history.

(56) References Cited

U.S. PATENT DOCUMENTS

| | | | | |
|---|---|---|---|---|
| 4,856,787 | A | 8/1989 | Itkis | |
| 6,652,378 | B2 | 11/2003 | Cannon et al. | |
| 7,963,847 | B2 | 6/2011 | Baerlocher | |
| 7,980,948 | B2 | 7/2011 | Rowe et al. | |
| 8,021,230 | B2 | 9/2011 | Baerlocher et al. | |
| 8,235,791 | B2 | 8/2012 | Kelly | |
| 8,241,106 | B2 | 8/2012 | Kelly | |
| 8,251,791 | B2 | 8/2012 | Baerlocher et al. | |
| 8,684,830 | B1 * | 4/2014 | Chun | G07F 17/322 463/25 |
| 8,900,057 | B2 | 12/2014 | Johnson | |
| 8,905,831 | B2 | 12/2014 | Lafky et al. | |
| 9,336,650 | B2 | 5/2016 | Naylor et al. | |

(Continued)

OTHER PUBLICATIONS

Official Action for U.S. Appl. No. 16/216,140, dated Jun. 15, 2020 6 pages Restriction Requirement.

(Continued)

*Primary Examiner* — Michael A Cuff
(74) *Attorney, Agent, or Firm* — Sheridan Ross P.C.

(57) ABSTRACT

A system may manage a first prize pool based on a plurality of wagers placed at a plurality of electronic gaming machines (EGMs) for a game of chance or skill. A second prize pool may be managed based on a plurality of back-bet wagers placed at the plurality of user computational devices for an outcome of the game of chance or skill. An award can be distributed from the first prize pool in connection with the game of chance or skill to a player at one of the plurality EGMs and an award from the second prize pool can be automatically distributed to a player at one of the user computational devices in response to distributing the award from the first prize pool.

20 Claims, 17 Drawing Sheets

(56) References Cited

U.S. PATENT DOCUMENTS

| | | | | |
|---|---|---|---|---|
| 9,595,159 | B2 | 3/2017 | Chun | |
| 9,811,236 | B2 | 11/2017 | Hilbert et al. | |
| 10,171,262 | B2 | 1/2019 | Krammer et al. | |
| 10,643,427 | B2 | 5/2020 | Arnone et al. | |
| 10,777,041 | B2 * | 9/2020 | Lutnick | G07F 17/3258 |
| 11,037,408 | B2 | 6/2021 | Higgins et al. | |
| 11,080,967 | B2 | 8/2021 | Higgins et al. | |
| 2009/0111573 | A1 * | 4/2009 | Iddings | G07F 17/3267 463/25 |
| 2009/0227354 | A1 * | 9/2009 | Johnson | G07F 17/32 463/20 |
| 2009/0239653 | A1 * | 9/2009 | Yoshizawa | G07F 17/3202 463/43 |
| 2011/0263318 | A1 | 10/2011 | Agarwal et al. | |
| 2012/0315984 | A1 | 12/2012 | Carrico et al. | |
| 2014/0302915 | A1 * | 10/2014 | Lyons | G07F 17/3237 463/25 |
| 2015/0102105 | A1 | 4/2015 | Perret et al. | |
| 2015/0119131 | A1 * | 4/2015 | Pececnik | G07F 17/3209 463/25 |
| 2016/0005272 | A1 * | 1/2016 | Van Asdale | G07F 17/3293 463/11 |
| 2016/0109942 | A1 | 4/2016 | Lyons et al. | |
| 2018/0137317 | A1 | 5/2018 | Lee et al. | |
| 2019/0051101 | A1 * | 2/2019 | Russ | G07F 17/3211 |
| 2020/0043293 | A1 | 2/2020 | Nelson et al. | |

OTHER PUBLICATIONS

Official Action for U.S. Appl. No. 16/216,140, dated Oct. 29, 2020 11 pages.

Notice of Allowance for U.S. Appl. No. 16/216,140, dated Feb. 11, 2021 9 pages.

* cited by examiner

SYSTEM, METHOD, AND DEVICE FOR BACK-BETTING PROGRESSIVE PRIZE POOLS IN A GAMING SYSTEM

CROSS REFERENCE TO RELATED APPLICATION

The present application is a divisional of U.S. patent application Ser. No. 16/216,140, filed Dec. 11, 2018, the entire disclosure of which is hereby incorporated by reference.

BACKGROUND

The present disclosure relates to gaming systems and, in particular, back-betting a progressive prize pool in a gaming system.

Progressive prize pools are a concept in gaming where a portion of the amount wagered at a slot machine or electronic gaming machine (EGM) funds a prize that is awarded when a particular outcome is hit on the slot machine or EGM. The progressive prizes often grow to very large values including hundreds of thousands or even millions of dollars. Smaller awards that are awarded frequently are also a type of progressive awards. Progressive prizes are funded by what are called contributions. Contributions are a percentage of a player's wager. Contributions from a single wager can fund multiple prizes and multiple prize levels. Prize levels are typically set up to allow awarding different prize amounts commensurate with the player's wager on a particular game. A larger wager would be eligible for a larger prize.

Progressive systems have been built to account for and track play and prize contribution data and are common in the casino industry. An EGM can contribute to multiple progressive prizes. An EGM may contribute to a progressive prize or a game within a multi-game capable EGM may contribute to a progressive prize while another game within the multi-game EGM may contribute to the same or a different prize. A progressive prize can have multiple win levels meaning, for example, a winning player may receive a smaller award for a less than maximum wager.

BRIEF SUMMARY

In certain embodiments, the present disclosure relates to a back-betting system, method, and EGM. In some embodiments, a method of facilitating back-betting or progressive prize pool in a gaming system is provided that includes: maintaining, by a central gaming server, an electronic record representing a first prize pool; assigning, by the central gaming server, a value to the electronic record representing the first prize pool, wherein the value assigned is based on data representing wagers placed for a game of chance or skill; maintaining, by a back-betting system, an electronic record representing a second prize pool; assigning, by the back-betting system, a value to the electronic record representing the second prize pool, wherein the value assigned to the second prize pool is based on data representing a plurality of back-bet wagers placed at a plurality of user computational devices for an outcome of the game of chance or skill; determining, by the central gaming server, that a first wager in the plurality of wagers is to be awarded from the first prize pool in connection with the game of chance or skill; and in response to determining that the first wager in the plurality of wagers is to be awarded from the first prize pool, re-assigning, by the back-betting system, the value of the electronic record representing the second prize pool, the re-assigned value reflecting a distribution of an award from the second prize pool.

In some embodiments, an electronic gaming machine (EGM) is provided that includes: a communication interface that facilitates machine-to-machine communications; a processor coupled with the communication interface; and a computer-readable storage medium coupled with the processor and having instructions that are executable by the processor, where the instructions include: a set of association instructions that enable a user computational device to associate with the EGM for purposes of the user computational device placing a back-bet wager with a back-betting system, where a distribution of an award for the back-bet wager is conditioned upon an outcome of a game of chance or skill played at the EGM; a set of primary gaming instructions that communicate information related to the game of chance or skill played at the EGM to a gaming system, where the information related to the game of chance or skill includes wager values placed for the game of chance or skill; and a set of back-betting instructions that communicate information related to the outcome of the game of chance or skill to the back-betting system.

In some embodiments, a system is provided that includes: a communication interface that facilitates communications with a plurality of electronic gaming machines (EGMs) and with a plurality of user computational devices; a processor coupled with the communication interface; and computer memory coupled with the processor and including processor-executable instructions that, when executed by the processor, cause the processor to: manage a first prize pool based on a plurality of wagers placed at the plurality of EGMs for a game of chance or skill; manage a second prize pool based on a plurality of back-bet wagers placed at the plurality of user computational devices for an outcome of the game of chance or skill; distribute an award from the first prize pool in connection with the game of chance or skill to a player at one of the plurality EGMs; and in response to distributing the award from the first prize pool, automatically distribute an award from the second prize pool to a player at one of the plurality of user computational devices.

Additional features and advantages are described herein and will be apparent from the following Description and the figures.

DETAILED DESCRIPTION

Figure 1:
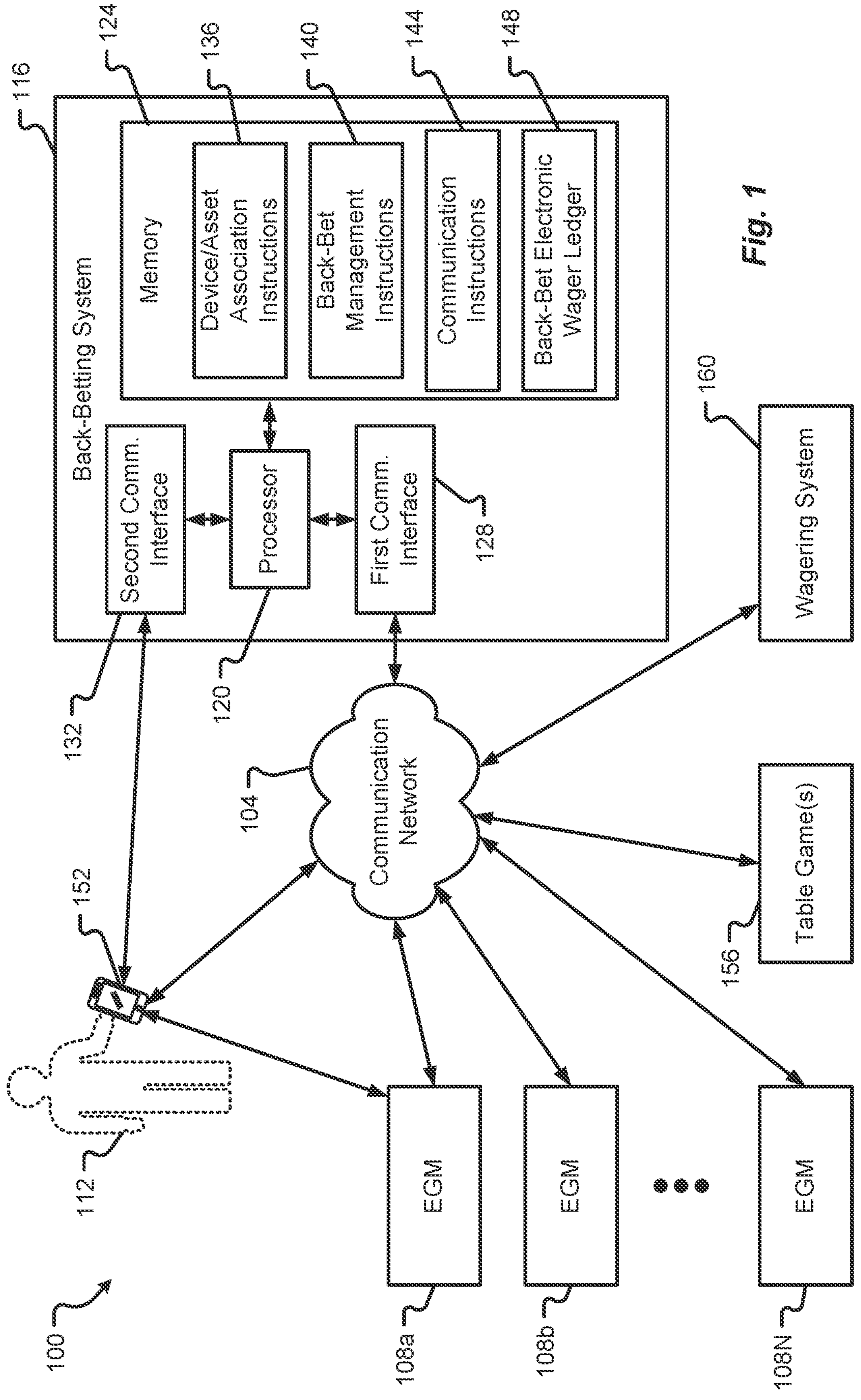
FIG. 1 is a block diagram of a gaming system accordance with embodiments of the present disclosure.

Embodiments of the present disclosure will be described in connection with a gaming system having one or multiple user devices that enable gaming activity. While certain embodiments of the present disclosure will reference the use of an EGM and mobile device as the pair of devices that enable back-betting, it should be appreciated that embodiments of the present disclosure are not so limited. For instance, any computing device, personal gaming device, or collection of computing devices interacting with one or many different casino assets such as table games, games of skill, etc. may be used to facilitate back-betting within a gaming system. Likewise, a player may be allowed to place a wager in connection with winning an award from a progressive prize pool at a device other than an EGM.

Bonuses, for the purposes of this document, are similar to progressive prizes in that a portion of each wager are used to fund the bonus pool. Bonuses, in some embodiments, may be awarded by a back-end system, such as a back-betting system, when some condition is reached rather than a discrete outcome on the game is achieved. Often this concept is called a mystery progressive. The remainder of the present disclosure will use the term progressive to refer to both bonuses and progressive prizes except where otherwise bonuses are explicitly mentioned.

Back-betting at an EGM, such as a slot machine or poker machine, can be done in a variety of ways, although there are a few obstacles to address: (1) creating a back-betting session or establishing an association between the EGM and back-betting player's device; (2) managing placement of back-bets placed at the back-betting player's device; and (3) ending the back-betting session.

In some embodiments, the back-betting process is initiated by establishing an association between a back-betting player's device (e.g., a mobile device) and the EGM that they wish to back-bet on. An association can be achieved in a variety of ways including, without limitation: tapping a mobile device to a designated pairing region on the EGM, such as the card reader bezel, to create a wireless connection between the back-betting player's mobile device and the EGM; tapping a back-betting player's mobile device to a pairing region explicitly designated for back-betting, such as the back of the chair in front of an EGM; pairing at a distance, where the player selects the EGM, either from a list of EGMs within the player's proximity as determined by radio signal strength, or from a list of EGMs which are "hot" nearby or across the casino floor; pairing via an optical code, barcode, or QR code displayed on the machine; a primary gambling player may disallow back-betting on the EGM the player is playing; a primary gambling player may be given the option to allow a back-bet session or not; and only once the EGM association or pairing has completed can the back-betting player move on to the next step, which is to place back-bets.

The back-betting application can be run on a mobile device, a tablet, or any other computing platform. In some embodiments, the application can run on a mobile or personal computational device allowing for proximity pairing as described above. The application could run on a Personal Computer (PC)-like device or laptop-like device. Embodiments of the present disclosure contemplate an area in a casino dedicated to back-betting with a set of terminals dedicated to back-betting. Embodiments of the present disclosure also contemplate the back-betting player being able to wager from a personal device in his room or via the television or other casino-provided device in his room. In some embodiments, the application can run on any computing platform allowing the back-betting player to review the floor via a map or list of EGMs looking for machines of a certain criteria. In some embodiments, a back-betting player may search for a "hot" machine or machines that have not hit a jackpot in a long time. The back-betting player can then select that machine that meets their filter criteria and attempt to initiate a back-betting session with the selected machine.

There are two or more ways to place back-bets on an EGM. In some embodiments, the EGM itself could be responsible for receiving back-bets, recording the back-bets, and paying back-betting players in addition to paying primary gambling players. Alternatively or additionally, a back-betting system could interact with the EGM, collect back-bets, and pay players based upon the outcomes reported by an EGM.

In some embodiments, the EGM is the entity coordinating back-bets. In this architecture, when players pair or associate their mobile device with the EGM, the EGM is responsible for working with the back-betting player's mobile device to determine the amount of the back-bet per session, funding the back-bet with funds from the player, such as from the player's cashless wagering system, and awarding winnings. In this architecture, the EGM may be configured to account for all transfers, wagers, and awards related to back-betting activity and may, therefore, create and report the following meters:

- Transfers onto the EGM for back-bets
- Transfers off the EGM associated with back-bets
- Credit meter to hold funds associated with transfers onto the EGM, or wins associated with back-bets
- Meter for wagers associated with back-bets
- Meter for game awards associated with back-bets The above meters may be managed on a per-EGM basis or on a per back-better basis if multiple back-betting players are betting on a single EGM.

In some embodiments, the back-betting can be treated as an activity managed by a dedicated back-betting system or mobile gaming system, where the EGM determines the wagers and wins, and that data is then fed to the back-bet system to determine the amount to debit or credit to a given back-bet session. In some embodiments, the player's mobile device can pair with an EGM or slot machine interface board (SMIB), and coordinate wagers with the EGM or SMIB, which in turn communicates with the back-end back-betting system. Alternatively or additionally, the back-betting player's mobile device may communicate with the EGM/SMIB for pairing only, and communicate directly with the back-betting system for all other back-bet related information.

In yet another model, it may be possible to facilitate pairing or device association without requiring a direct interaction between the back-betting player's mobile device and the EGM/SMIB. Rather, the EGM may be selected by the back-betting player on their mobile device, possibly from a list published by the back-betting system, or from a list of EGMs within wireless range, and back-bets are coordinated directly between the mobile app on the player's mobile device and the back-betting system.

In an EGM today, a set of meters electronically stored in the EGM tracks all money in and out of the EGM. Accounting systems can read the meters from the EGMs and generate revenue and performance reports on the play at the EGM. This reporting includes tracking the progressive prizes and their values as it relates to the play tracked by the EGM meters. In this system coordinated back-betting model and in accordance with at least some embodiments, meters may not be used to track back-bets. Rather, a transaction model of accounting is conceived for the purposes of tracking play. In some embodiments, each wager placed by a back-betting player could be transmitted to the accounting system and an electronic ledger would record the wager. Included in the transaction would be, for example, the amount wagered and the amount won. At the end of the gaming day, the recorded transactions could be accumulated, and reports generated that tracked the back-betting play and the progressive prize values. In still other embodiments, the back-betting system could be configured to synthesize meters which simulated the meters generated by the EGM.

Back-betting progressives are simply progressive prizes as described above, however, the progressive prizes may be funded by back-bet wagers while the primary gambling player playing the physical EGM is the only player eligible for the normal progressive prize. In some embodiments, the back-bet prize pools are separate from the prize pool the primary gambling player at the EGM. However, in some embodiments, the normal progressive prize pool could also be partially funded by a share of the back-bet contributions.

In some embodiments, the progressive prizes that are funded by back-bets are hit when the primary gambling player at the EGM hits the outcome that produces a prize or, in the case of bonuses, when a condition on the back-end system is reached. The back-betting player, in some embodiments, may be awarded the back-bet-funded progressive prize and the prize level commensurate with the back-betting player's bet level. The primary gambling player that is playing the normal progressive contest may be awarded the normal progressive prize and prize level commensurate with his bet level.

It is possible and contemplated that multiple players are back-betting the same primary gambling player playing the EGM. In the case of the multiple players back betting the same game and the progressive prize hits, the multiple back-betting players may be awarded the prize and prize level commensurate with their back-bet level. If multiple back-betting players are back-betting the same game and are betting at the same level when the progressive prize is hit by the primary gambling player, then the back-bet progressive prize may be split equally or commensurately between the multiple back-betting players, depending on each winning player's wager.

In some embodiments, in an EGM, a set of meters electronically stored in the machine tracks all of the money in and out of the EGM. Accounting systems are able to read the meters from the EGMs and generate revenue and performance reports on the play at the EGM. This reporting may include tracking the progressive prizes and their values as it relates to the play tracked by the EGM meters. In some embodiments disclosed herein, meters may not be needed to track back-bets. Rather, a transaction model of accounting is provided for the purposes of tracking back-bet play. As an example, each back-bet wager placed by a back-betting player could be transmitted to the back-betting system and an electronic ledger would record the back-bet wager. Included in the transaction may be, at least, the amount of money wagered and the amount of money won in the back-bet. At the end of the gaming day, the recorded transactions may be accumulated and reports generated that track the back betting play and the progressive prize values. In another embodiment, the disclosed back-betting system could synthesize meters that simulated the meters generated by the EGMs.

With reference initially to FIG. 1, details of an illustrative gaming system 100 will be described in accordance with at least some embodiments of the present disclosure. The components of the gaming system 100, while depicted as having particular instruction sets and devices, is not necessarily limited to the examples depicted herein. Rather, a system according to embodiments of the present disclosure may include one, some, or all of the components depicted in the system 100 and does not necessarily have to include all of the components in a single device. For instance, the components of a back-betting system may be contained within a single server or distributed amongst a plurality of servers and/or other devices (e.g., an EGM, user computational device, etc.) in the system 100 without departing from the scope of the present disclosure.

The gaming system 100 is shown to include a communication network 104 that interconnects and facilitates machine-to-machine communications between one or multiple gaming devices (e.g., EGMs) 108*a*-N, a wagering system 160, and a back-betting system 116. It should be appreciated that the communication network 104 may correspond to one or many communication networks without departing from the scope of the present disclosure. In some embodiments, the various EGMs 108*a*-N and systems(s)/server(s) 116, 160 may be configured to communicate using various nodes or components of the communication network 104. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the EGMs 108*a*-N may be distributed throughout a single property or premises (e.g., a single casino floor) or the EGMs 108*a*-N may be distributed among a plurality of different properties. In a situation where the EGMs 108*a*-N are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The EGMs 108*a*-N may utilize the same or different types of communication protocols to connect with the communication network 104. It should also be appreciated that the EGMs 108*a*-N may or may not present the same type of game to a player 112. For instance, the first EGM 108*a* may correspond to a gaming machine that presents a slot game to the player 112, the second EGM 108*b* may correspond to a video poker machine, and other gaming devices may present other types of games or a plurality of different games for selection and eventual play by the player 112. It may be possible for the some of the EGMs 108*a*-N to communicate with one another via the communication network 104. In some embodiments, one or more of the EGMs 108*a*-N may only be configured to communicate with a centralized management server in the form of a wagering system. The wagering system 160 may include components that manage wagers at the EGMs 108*a*-N, manage game play at the EGMs 108*a*-N, monitor player activity at the EGMs 108*a*-N, and/or perform any other task in connection with games played by a player at the EGMs 108*a*-N. It should also be appreciated that the wagering system 160 may be configured to manage game play at non-EGM assets such as table games 156 and other locations where players 112 are allowed to participate in a game of chance or skill or wager on outcomes of those games of chance.

As will be discussed in further detail herein, a back-betting player 112 may be allowed to participate in a back-betting session with any type of asset within the gaming system 100, such as an EGM 108*a*-N, a table game 156, and the like. In some embodiments, a player 112 may be enabled to participate in a back-betting session for a particular asset using the player's computational device 152. The computational device 152 may correspond to a mobile communication device, such as a smartphone, tablet, laptop, PDA, wearable device, an augmented reality headset, a virtual reality headset, or the like. In other embodiments, the computational device 152 may correspond to a PC, kiosk, or the like that facilitates remote back-betting sessions for the player 112. In some embodiments, the computational device 152 may be configured to communicate directly with an EGM 108*a*-N (or table game 156). Direct communications may utilize a proximity-based communication protocol such as NFC, Bluetooth®, BLE, WiFi, or the like. Alternatively or additionally, the computational device 152 may be configured to communicate directly with the back-betting system 116. Alternatively or additionally, the computational device 152 may be configured to communicate with other devices in the system 100 via the communication network 104. Such communications may be secured (e.g., encrypted) or unsecured depending upon the nature of information exchanged during the communications. A mobile device may correspond to a player's 112 computational device 152 or to a device issued to the player 112 during the player's visit at a particular casino.

It should be appreciated that the server(s) implementing the back-betting system 116 may or may not be co-located with one or more EGMs 108*a*-N in the same property or premises. Thus, one or more EGMs 108*a*-N may communicate with the back-betting system 116 over a WAN, such as the Internet. In such an event, a tunneling protocol or Virtual Private Network (VPN) may be established over some of the communication network 104 to ensure that communications between an EGM and a remotely-located server are secured.

It should also be appreciated that the server(s) implementing the back-betting system 116 may or may not be co-located with the server(s) implementing the wagering system 160. Further still, it may be possible to provide the functionality of the back-betting system 116 and the wagering system 160 within a single server or server cluster.

The EGMs 108*a*-N may correspond to a type of device that enables player 112 interaction in connection with playing games of chance. An EGM 108*a*-N may include any type of known gaming device such as a slot machine, keno machine, an electronic table game (e.g., video poker), a skill-based game, etc. In addition to playing games of chance or skill on an EGM 108*a*-N, the player 112 may also be allowed to interact with and play games of chance or skill on their computational device 152. Thus, the player 112 may play games directly on their device 152 and/or the device 152 may be in communication with the back-betting system 116 to facilitate back-betting sessions for one or more EGMs.

The back-betting system 116 is shown to include a number of components that facilitate the establishment, management, and conclusion of back-betting sessions for a back-betting player 112. Although not depicted, the wagering system 160 may include similar components, such as a network interface, processor, and computer memory. Thus, the components depicted as being included in the back-betting system 116 may also be included in the wagering system 160 without departing from the scope of the present disclosure. The details of the wagering system 160 are not shown in FIG. 1 for purposes of clarity and ease of discussion and should not be construed as limiting embodiments described herein.

The gaming server 116 is shown to include a processor 120, memory 124, and a plurality of network interfaces 128, 132. These resources may enable functionality of the back-betting system 116 as will be described herein. For instance, the first network interface 128 provides the system 116 with the ability to send and receive communication packets or the like over the communication network 104. The first network interface 128 may be provided as a network interface card (NIC), a network port, drivers for the same, and the like. Communications between the components of the system 116 and other devices connected to the communication network 104 may all flow through the first network interface 128. The back-betting system 116 is also shown to include a second communication interface 132 that facilitates communications with a user computational device 152. In some embodiments, the second communication interface 132 may be similar to the first communication interface 128. For instance, the second communication interface 132 may also include a NIC, network port, drivers for the same, and the like. In some embodiments, the first and second communication interfaces 128, 132 may be provided in a single physical component or set of components, but may correspond to different communication channels (e.g., software-defined channels, frequency-defined channels, amplitude-defined channels, etc.) that are used to send/receive different communications to the EGMs 108*a*-N as compared to the computational device 152. In some embodiments, a single communication interface may facilitate communications with both the EGMs 108*a*-N and the computational device 152, especially if both devices communicate with the back-betting system 116 via the communication network 104.

It should also be appreciated that, while not depicted, a separate communication network may enable communications between the computational device 152 and back-betting system 116. The separation communication network may utilize cellular communication technologies, wireless communication technologies, or the like. Thus, the separate communication network may include a WLAN, cellular network, or the like. As will be discussed in further detail herein, the first interface 128 may be used to facilitate machine-to-machine communications with EGMs 108*a*-N and to exchange state-of-play information with the EGMs 108*a*-N. The second interface 132 may be used to facilitate machine-to-machine communications with the computational device 152 (e.g., a mobile device), to exchange back-bet wager information, and to deliver an indication of an outcome of a back-bet placed during a back-betting session established with the computational device 152.

The processor 120 may correspond to one or many computer processing devices. For instance, the processor 120 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various authentication functions of the back-betting system 116.

The memory 124 may include any type of computer memory device or collection of computer memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions.

The illustrative instruction sets that may be stored in memory 124 include, without limitation, a device/asset association instruction set 136, a back-bet management instruction set 140, a communication instruction set 144, and a back-bet electronic wager ledger 148. Functions of the back-betting system 116 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the system 116. Said another way, the particular instruction sets depicted in FIG. 1 should not be construed as limiting embodiments described herein.

In some embodiments, the device/asset association instruction set 136, when executed by the processor 120, may enable the back-betting system 116 to help facilitate the establishment of an association between a computational device 152 and an asset within the gaming system 100. More specifically, the device/asset association instruction set 136 may be configured to enable an association between the computational device 152 and an EGM 108*a*-N that can be leveraged by the back-bet instruction set 140 for purposes of creating and maintaining a back-bet session for a back-betting player on their computational device 152. The device/asset association instruction set 136 may also be used to monitor an association between a computational device 152 and asset and determine when the association has been broken (e.g., the devices have unpaired from one another). In some embodiments, the device/asset association instruction set 136 may be configured to report the establishment and conclusion of associations or pairings between devices to other instruction sets stored in memory 124.

The back-bet management instruction set 140, when executed by the processor 120, may enable the back-betting system 116 to track a status of back-betting sessions, accept back-bet wagers over the back-betting sessions, manage back-bet wagers, pay out back-bet wagers, and perform any other function related to the general management of back-betting sessions. In some embodiments, the back-bet management instructions 140 may be configured to synchronize back-bet wagers with events that occur at the EGMs 108*a*-N, table games 156, and other assets in the system 100. For instance, the back-bet management instruction set 140 may be configured to determine whether and when back-bets for a particular asset are allowable or not and, if such back-bets are allowable, the amounts and circumstances associated with such back-bets. It should also be appreciated that the back-bet management instruction set 140 may be configured to manage a back-bet prize pool and the distribution of awards therefrom.

The communication instruction set 144, when executed by the processor 120, may enable the back-betting system 116 to communicate with the other devices in the system 100. For instance, the communication instruction set 144 may be configured to modulate/demodulate communications exchanged over the communication network 104, determine timings associated with such communications, determine addresses associated with such communications, etc. In some embodiments, the communication instruction set 144 may be configured to allocate communication ports of the system 116 for use as either the first or second communication interface 128, 132 as appropriate. The communication instruction set 144 may further be configured to generate messages in accordance with communication protocols used by the network 104 and to parse messages received via the network 104.

The back-bet electronic wager ledger 148 may correspond to an electronic record or plurality of electronic records maintained by the back-betting system 116 in connection with managing back-bets placed at computational devices 152. In some embodiments, the back-bet electronic wager ledger 148 may be used to store information related to back-bets placed during a back-betting session, amounts of back-bets, the timing associated with back-bets, results of back-bets, etc. In some embodiments, the back-bet electronic wager ledger 148 may be used to store back-bet amounts wagered and amounts won. Such amounts may be stored with a relationship to the back-betting player 112, the back-betting player's computational device 152, and/or the asset that was associated with the computational device 152 during the back-betting session. The back-bet electronic wager ledger 148 may also be used to store unique identifiers assigned to back-betting sessions for purposes of reporting to various gaming authorities.

As discussed above, the wagering system 160 may also include a processor and memory. In some embodiments, the wagering system 160 may include a game management instruction set that, when executed by the processor of the wagering system 160, may enable the system 160 to manage the various games played by a primary gambling player 112 at the EGMs 108*a*-N, table game(s) 156, and/or computational device 152 carried by the player 112. In other words, any game played by the player 112 at one or more of the devices 108*a*-N, 152, 156 may be managed, partially or entirely, by execution of the game management instruction set. The game management instruction set may also be configured to track a status of game events (e.g., sporting events, bingo, keno, lottery, etc.) and whether a primary gambling player 112 has placed a wager on such events.

Figure 2A:
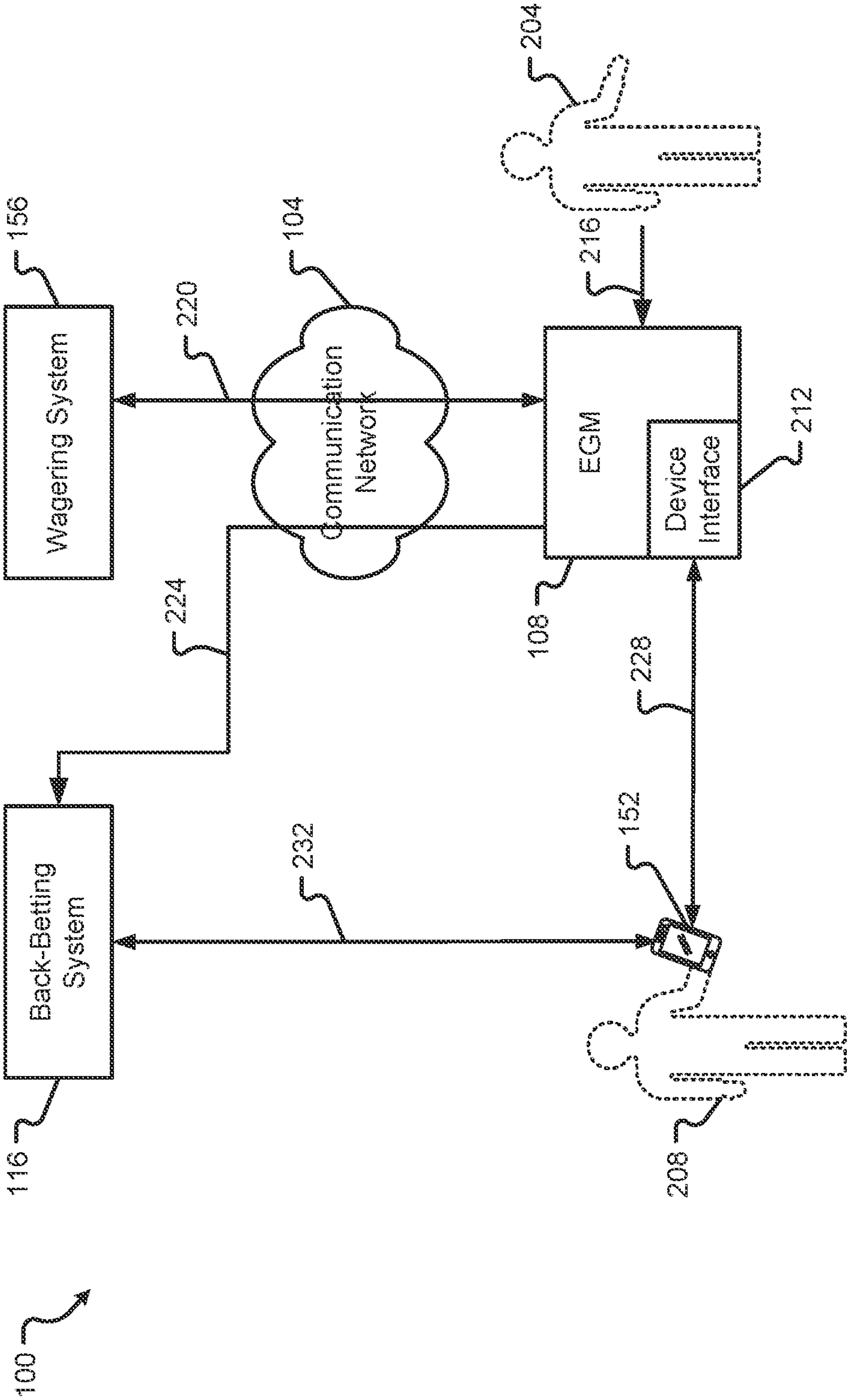
FIG. 2A is a block diagram depicting a first illustrative gaming system configuration in accordance with embodiments of the present disclosure.
Figure 2B:
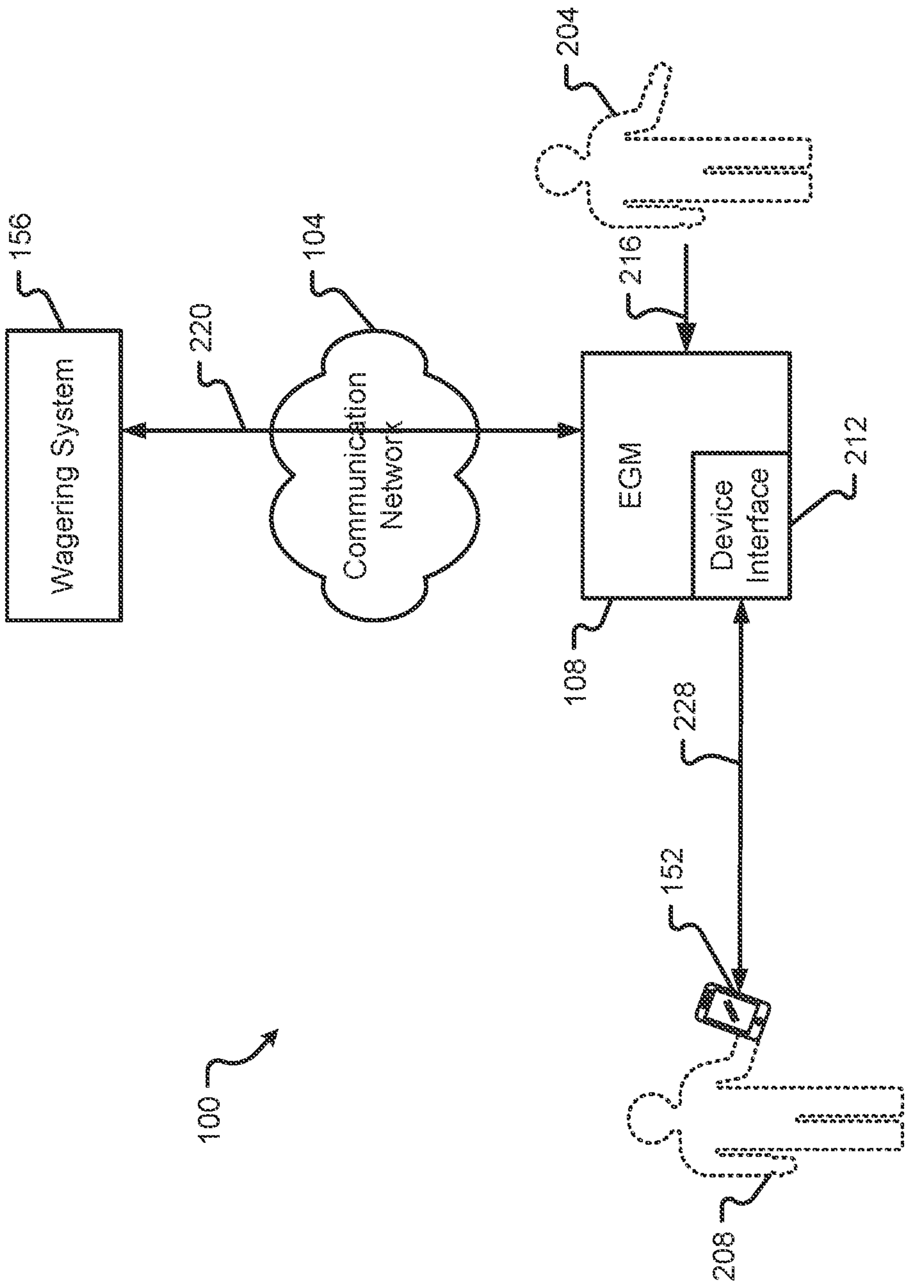
FIG. 2B is a block diagram depicting a second illustrative gaming system configuration in accordance with embodiments of the present disclosure.
Figure 2C:
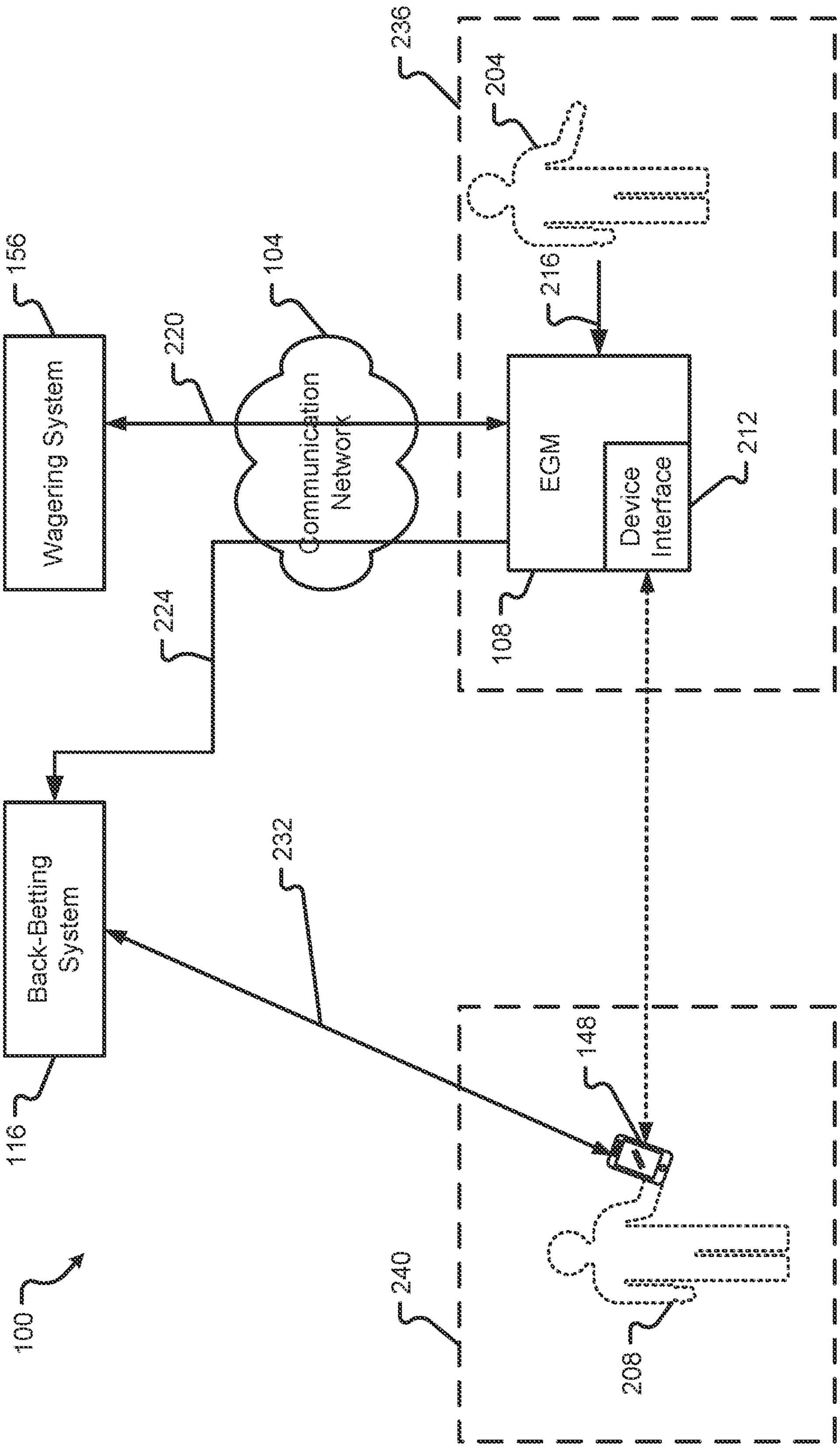
FIG. 2C is a block diagram depicting a third illustrative gaming system configuration in accordance with embodiments of the present disclosure.

With reference now to FIGS. 2A-C, additional details and possible configurations of the system 100 will be described in accordance with at least some embodiments of the present disclosure. With reference initially to FIG. 2A, a first possible configuration of the system 100 will be described. In this particular configuration, back-betting sessions are managed by the back-betting system 116 either alone or in cooperation with the wagering system 160. In some embodiments, the EGM 108 may be configured to determine wagers and wins for a primary gambling player 204 in connection with a game played at the EGM 108. The EGM 108, in this configuration, may or may not also serve as a conduit for communications between the computational device 152 and the back-betting system 116. Specifically, in some embodiments, the computational device 152 may be configured to communicate directly with the back-betting system 116 such that communications concerning a back-betting session that includes the EGM 108 still bypass the EGM 108. However, in some embodiments, the computational device 152 may be configured to communicate at least some back-betting information with the back-betting system 116 through a device interface 212 of the EGM 108. In either situation, the back-betting system 116 may be configured to determine an amount to debit or credit to a particular back-betting session and/or player account for a back-betting player 208.

In some embodiments, the device interface 212 may include a wireless radio (e.g., Bluetooth interface, a BLE interface, an NFC interface, etc.). The device interface 212 may be in the form of an antenna embedded in the EGM 108 or as part of an SMIB. In some embodiments, the device interface 212 may be configured to establish and maintain the third communication pathway 228 with the computational device 152.

In the depicted embodiment, a first player 204 (e.g., a primary gambling player 204) is interfacing with the EGM 108 whereas a second player 208 (e.g., a back-betting player 208) is involved in a back-betting session that concerns the EGM 108 at which the first player 204 is playing. In some embodiments, the back-betting session may be facilitated by associating the computational device 152 with the EGM 108. This particular configuration exhibits a first communication pathway 220 between the EGM 108 and wagering system 160, a second communication pathway 224 between the EGM 108 and back-betting system 116, a third communication pathway 228 between the EGM 108 and computational device 152, and a fourth communication pathway 232 between the back-betting system 116 and computational device 152.

In some embodiments, the first communication pathway 220 may pass through the communication network 104 and be used to exchange game play information between the wagering system 160 and EGM 108. More specifically, the primary gambling player 204 may be allowed to interface 216 with the EGM 108 and place bets thereon in connection with a game of chance, game of skill, or the like. Outcomes for the game(s) played by the primary gambling player 204 may be communicated between the EGM 108 and wagering system 160. In some embodiments, the wagering system 160 may be used to manage a cashless wagering account for the primary gambling player 204. Thus, wager information, win information, state-of-play information, and the like for the game of chance or skill may be exchanged over the first communication pathway 220.

In some embodiments, the second communication pathway 224 may also pass through the communication network 104. The second communication pathway 224 may be used to carry back-bet information from the EGM 108 to the back-betting system 116. The back-bet information communicated over the second communication pathway 224 may include, without limitation, wager information for wagers placed by the primary gambling player 204, win information for wins achieved by the primary gambling player 204, and, optionally, back-bet information for a back-bet session involving the EGM 108 and computational device 152. State-of-play information and/or outcomes for games played by the primary gambling player 204 may be communicated to the back-betting system 116 via the second communication pathway 224.

The third communication pathway 228 may correspond to a wireless communication link established directly between the computational device 152 and EGM 108. Thus, establishment and maintenance of the third communication pathway 228 may require the computational device 152 to be within a predetermined distance of the EGM 108 (e.g., a wireless communication range). In some embodiments, the existence of the third communication pathway 228 may be required as part of determining an association exists between the EGM 108 and computational device 152. For instance, an association for back-betting purposes may require that the EGM 108 be paired with the computational device 152 vis-à-vis the third communication pathway 228. A failure to establish or maintain the third communication pathway 228 may result in a disassociation of the computational device 152 with the EGM 108, thereby resulting in a discontinuation of a back-betting session for the computational device 152 with respect to the EGM 108. The third communication pathway 228 may, in some embodiments, be used to carry back-bet information between the computational device 152 and EGM 108. Likewise, state-of-play information for a game played at the EGM 108 may be communicated to the computational device 152 via the third communication pathway 228.

The fourth communication pathway 232 may correspond to a direct pathway between the computational device 152 and back-betting system 116. In some embodiments, the fourth communication pathway 232 may bypass the EGM 108 and may or may not also bypass the communication network 104. In some embodiments, the fourth communication pathway 232 may traverse a communication network other than the communication network 104 that is provided between the EGM 108 and systems 116, 156. The fourth communication pathway 232 may be used to communicate back-bet information directly from the computational device 152 to the back-betting system 116. In situations where the fourth communication pathway 232 is used, the EGM 108 may still communicate state-of-play information to the back-betting system 116 via the second communication pathway 224. In this situation, the back-betting system 116 may be configured to correlate state-of-play information received over pathway 224 with back-bet wager information received over pathway 232. Likewise, results of back-bets may be communicated from the system 116 back to the computational device 152 and EGM 108 and such communications may be synchronized to the extent that the primary gambling player 204 is being informed of back-bet activity by the back-betting player 208 on the computational device 152. Thus, although pathway 224 is depicted as being unidirectional, it should be appreciated that the pathway 224 may be bidirectional without departing from the scope of the present disclosure.

With reference now to FIG. 2B, an alternative configuration of the system 100 will be described in accordance with at least some embodiments of the present disclosure. In this configuration, the EGM 108 may correspond to the entity coordinating back-bets made by the back-betting player 208 at the computational device 152. Thus, the EGM 108 may be provided with the functionality of the back-betting system 116 depicted in FIG. 1. Alternatively or additionally, some back-betting functionality may be contained in and provided by the wagering system 160. In some embodiments, when players 208 pair their computational device 152 with the EGM 108, the EGM 108 may become responsible for working with the back-betting player's 208 device 152 to determine the amount of the back-bet per session, funding the back-bet with funds from the player 208, such as from the player's cashless wagering system, and awarding winnings. In some embodiments, the EGM 108 may be configured to account for all transfers, wagers, and awards related to back-betting activity at the device 152 and may, therefore, be provided with one or more credit meters as will be discussed in further detail herein. In this configuration, all back-bet information placed by the back-betting player 208 at the computational device 152 may be communicated via the third communication pathway 228. Thus, this particular configuration may require a pairing between the devices 108, 152 as part of associating the devices and establishing the back-betting session for the back-betting player 208.

With reference now to FIG. 2C, yet another configuration of the system 100 will be described in accordance with at least some embodiments of the present disclosure. The configuration depicted herein shows a back-betting player 208 being located at a location 240 or premises that is physically separated from a location 236 of the EGM 108. In some embodiments, the locations 236, 240 may be separated by more than a wireless communication range of the computational device 152 and/or EGM 108. Thus, this configuration may still enable an association between the devices 108, 152 for purposes of establishing the back-betting session, but the association may be based on something other than a direct pairing between the devices 108, 152. In some embodiments, state-of-play information may be communicated from the EGM 108 to the computational device 152 via the communication pathways 224, 232. Thereafter, back-bet information may travel from the computational device 152 to the back-betting system 116. It should be appreciated that this particular configuration may have delays associated with game play at the EGM 108 as compared to back-bets placed at the computational device 152. Such delays may be created by having information traverse so many communication pathways and, possibly, travel relatively long distances. Accordingly, in some embodiments, this particular configuration may not be as well-suited for real-time back-betting at the computational device 152. Rather, the computational device 152 may be configured to engage in pre-commit back-bet wagers such that the back-betting player 208 is allowed to pre-authorize certain back-bets based on events that occur at the EGM 108 and/or wagers placed by the primary gambling player 204. Additional details of pre-commit back-bet wagers will be described in further detail herein.

Figure 3A:
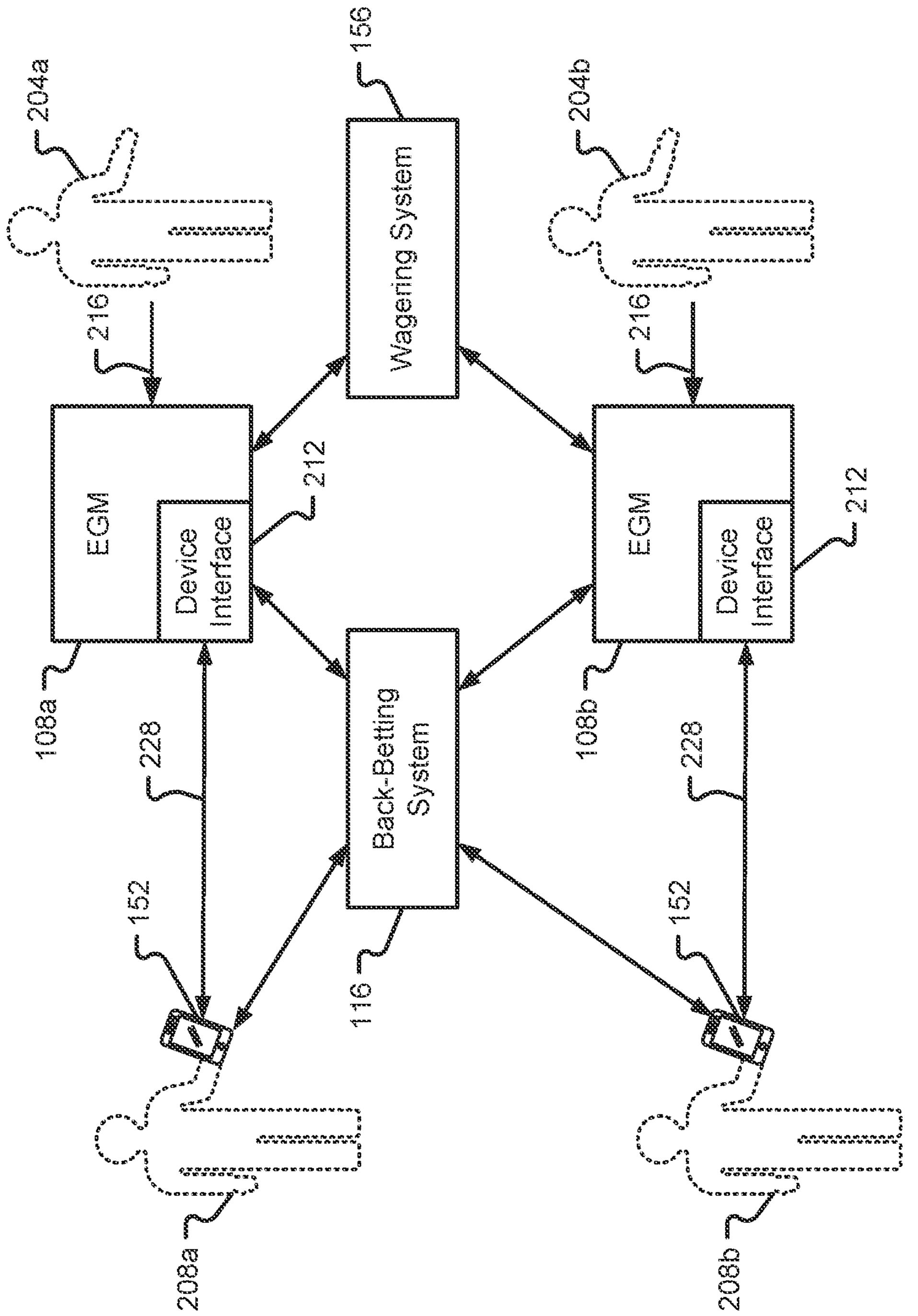
FIG. 3A is a block diagram depicting a first possible back-betting scenario in accordance with embodiments of the present disclosure.
Figure 3B:
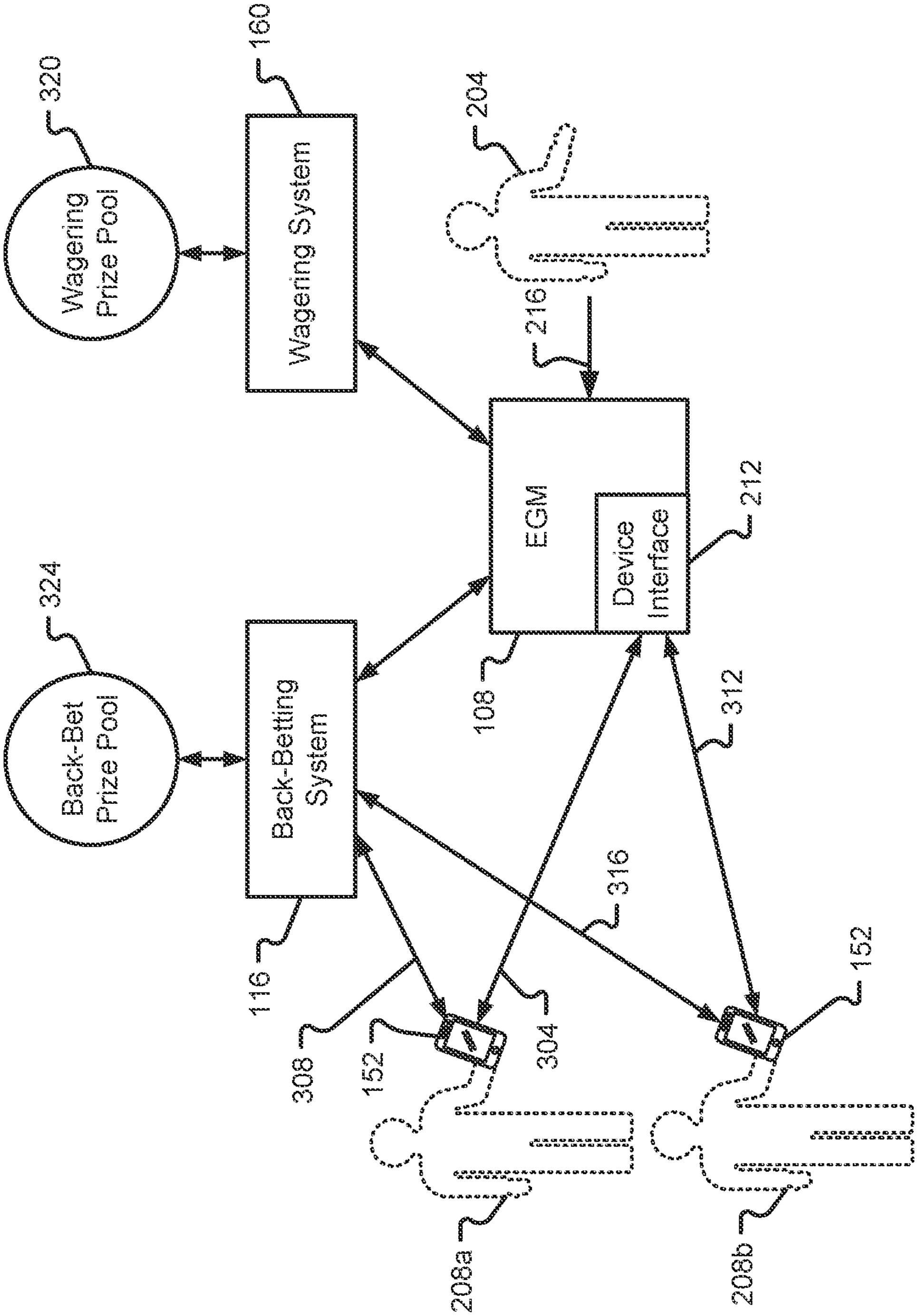
FIG. 3B is a block diagram depicting a second possible back-betting scenario in accordance with embodiments of the present disclosure.

With reference now to FIGS. 3A and 3B, various back-betting scenarios will be described in accordance with at least some embodiments of the present disclosure. Referring initially to FIG. 3A, a first back-betting scenario is shown where two different primary gambling players 204*a*, 204*b* are gambling on different EGMs 108*a*, 108*b*, respectively. In some embodiments, a first back-betting player 208*a* may be engaged in a first back-betting session with the first EGM 108*a* whereas the second back-betting player 208*b* may be engaged in a second back-betting session with the second EGM 108*b*. Thus, outcomes or events for games played by the first primary gambling player 204*a* at the first EGM 108*a* may affect back-bet wagers placed by the first back-betting player 208*a*, but not back-bet wagers placed by the second back-betting player 208*b*. Likewise, outcomes or events for games played by the second primary gambling player 204*b* at the second EGM 208*b* may affect back-bet wagers placed by the second back-betting player 208*b*, but not back-bet wagers placed by the first back-betting player 208*a*

FIG. 3A also shows that while multiple back-betting sessions are established simultaneously with different EGMs 108*a*, 108*b*, the various back-betting sessions can be simultaneously managed by a common back-betting system 116. Similarly, the wagering system 160 may be configured to simultaneously manage multiple gaming sessions at the various EGMs 108*a*, 108*b*.

FIG. 3B, on the other hand, shows a scenario where two or more back-betting players 208*a*, 208*b* are allowed to simultaneously establish a back-betting session with a common EGM 108. In some embodiments, the number of back-betting sessions simultaneously established with a particular EGM may be any number greater than one. Said another way, there does not necessarily need to be a limit placed on the number of back-betting sessions a single EGM 108 is allowed to be associated therewith. It is not necessarily a requirement that both back-betting players 208*a*, 208*b* place the same back-bets wagers or back-bet the same possible outcomes for the game of chance or skill being played by the primary gambling player 204. Said another way, each back-betting player 208*a*, 208*b* may be allowed to establish different back-betting sessions with the same EGM 108 such that one player's computational device 152 has a first pairing 304 established with the EGM 108 and the other player's computational device has a second pairing 312 established with the EGM 108. The different computational devices 152 may also establish unique communication pathways 308, 316 with the back-betting system 116 to ensure that the back-betting sessions are independently maintained.

FIG. 3B also shows that the wagering system 160 may be used to manage a wagering prize pool 320 and distribute awards or prizes from the wagering prize pool 320 to primary gambling players 204 based on outcomes at the EGMs 108. The back-betting system 116, on the other hand, may be configured to manage a back-bet prize pool 324 and distribute awards or prized from the back-bet prize pool 324 to back-betting players 208 based on results of back-betting sessions. The distribution of awards or prizes from the back-bet prize pool 324 may be conditional upon events that occur at the EGM 108 for the primary gambling player 204 whereas the distribution of awards or prizes from the wagering prize pool 320 may be based on outcomes of the games played by the primary gambling player 204 at the EGM 108. In some embodiments, a distribution of an award or prize from the wagering prize pool 320 to the primary gambling player 204 may correspond to an event that was back-bet wagered. In this particular situation, a distribution of an award or prize from the wagering prize pool 320 may result in an automatic distribution of an award or prize from the back-bet prize pool 324 if a corresponding back-bet was placed for the event of distribution to the primary gambling player 204 at the particular EGM 108 being played by the player 204. Accordingly, there may be different odds associated with a distribution of an award or prize from the wagering prize pool 320 as compared to a distribution of an award or prize from the back-bet prize pool 324.

In some embodiments, the back-bet prize pool 324 may be at least partially funded by the wagering prize pool 320 or vice versa. For example, the primary gambling player 204 on the EGM 108 could see no additional compensation when other players back-bet. In other embodiments, the primary gambling player 204 may receive a financial award from back-bets placed on the EGM 108 being played by the primary gambling player 204. In a simple but non-limiting example, the primary gambling player 204 may receive a fixed percentage of winnings from each back-better 208*a*, 208*b*. In other example, the primary gambling player 204 may receive a fixed fee or a percentage of each back-bet placed by the back-betting players 208*a*, 208*b*. As still another example, the primary gambling player 204 may receive a scaled fee based on some criteria, such as denomination or the number of concurrent back-betters, of the back-better's winnings.

Although not depicted, another possible back-betting scenario may involve a single back-betting player establishing a plurality of different back-betting sessions with different EGMs. Thus, the computational device 152 may be associated with a plurality of different EGMs and the back-betting player may utilize the computational device 152 to place a plurality of different back-bets on different EGMs via different back-betting sessions.

Figure 4:
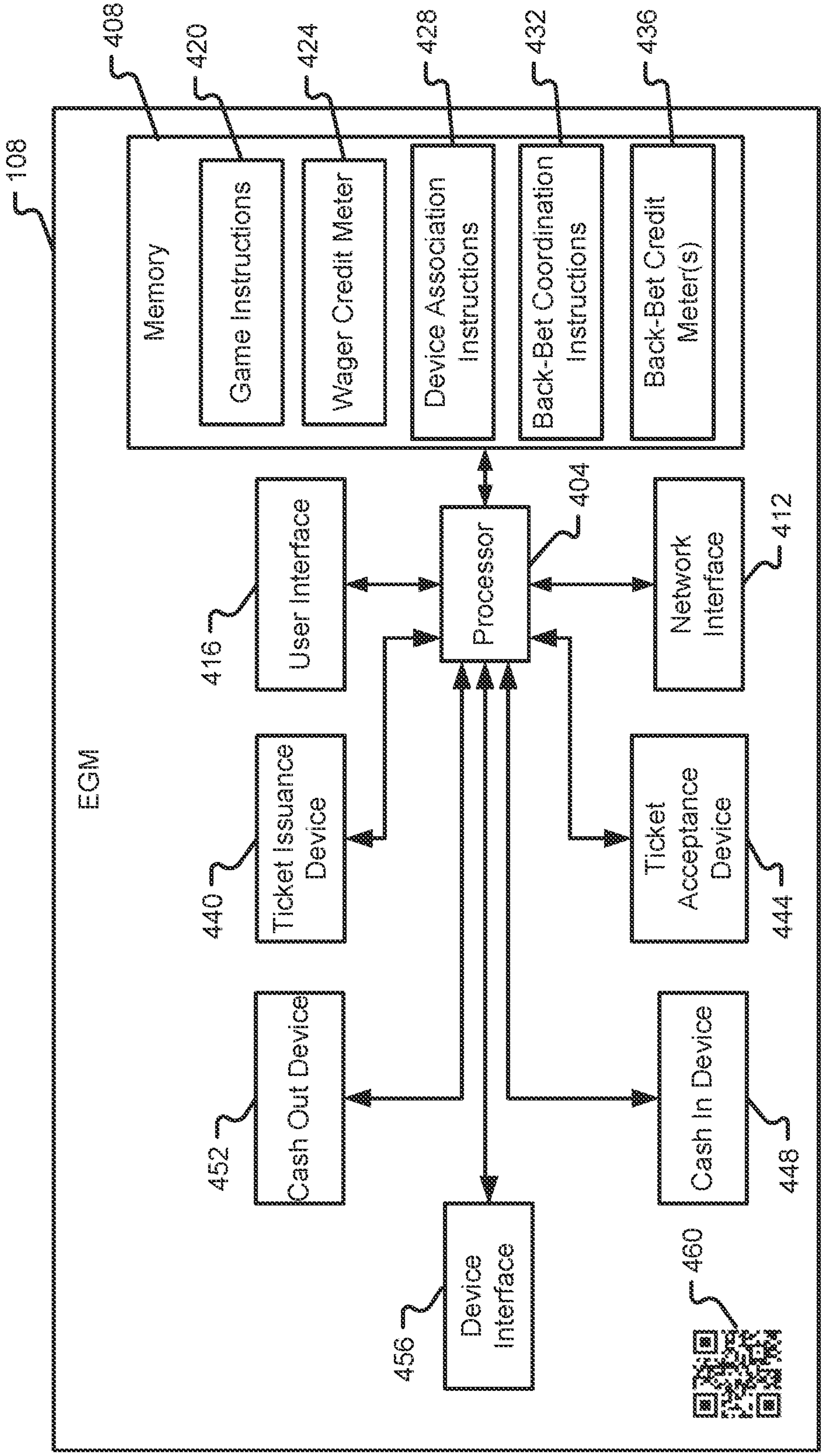
FIG. 4 is a block diagram depicting an illustrative EGM in accordance with embodiments of the present disclosure.

With reference now to FIG. 4, additional details of an EGM 108 will be described in accordance with at least some embodiments of the present disclosure. While embodiments will be discussed with reference to an EGM, it should be appreciated that a table game 156 or the like may have at least some components in common with the depicted EGM 108. For instance, a table game 156 may have an optical code or QR code 460 provided thereon that enables a computational device 152 to associate itself with the table game 156 or a player at the table game and thereby establish a back-betting session for the table game 156 or the player at the table game.

The EGM 108 is depicted to include a processor 404, memory 408, a network interface 412, a user interface 416, a ticket issuance device 440, a ticket acceptance device 444, a cash in device 448, and a cash out device 452. In some embodiments, the processor 404 may be similar or identical to the processor 120. In other words, the processor 404 may correspond to one or many microprocessors, CPUs, microcontrollers, or the like. The processor 404 may be configured to execute one or more instruction sets stored in memory 408.

The network interface 412 may also be similar or identical to network interface 128 or 132. The nature of the network interface 412, however, may depend upon whether the network interface 412 is provided in an EGM 108 or the nature of the device interface 212. Examples of a suitable network interface 412 include, without limitation, an Ethernet port, a USB port, an RS-232 port, an RS-485 port, a NIC, an antenna, a driver circuit, a modulator/demodulator, etc. The network interface 412 may include one or multiple different network interfaces depending upon whether the EGM 108 is connecting to a single communication network 104 or multiple different types of communication networks 104. For instance, the EGM 108 may be provided with both a wired network interface and a wireless network interface without departing from the scope of the present disclosure.

The user interface 416 may correspond to any type of input and/or output device that enables the player 112, 204 to interact with the EGM 108. As can be appreciated, the nature of the user interface 416 may depend upon the nature of the EGM 108. For instance, if the EGM 108 is a traditional mechanical reel slot machine, then the user interface 416 may include one or more mechanical reels with symbols provided thereon, one or more lights or LED displays, one or more depressible buttons, a lever or "one armed bandit handle", a speaker, or combinations thereof. If the EGM 108 is a digital device, then the user interface 416 may include one or more touch-sensitive displays, LED/LCD display screens, etc.

The memory 408 may be similar or identical to memory 124. For instance, the memory 408 may include one or multiple computer memory devices that are volatile or non-volatile. The memory 408 may be configured to store instruction sets that enable player interaction with the EGM 108, that enable game play at the EGM 108, and/or that enable coordination with the wagering system 160 or back-betting system 116. Examples of instruction sets that may be stored in the memory 408 include a game instruction set 420, a wager credit meter 424, a device association instruction set 428, a back-bet coordination instruction set 432, and one or more back-bet credit meters 436.

In some embodiments, the game instructions 420, when executed by the processor 404, may enable the EGM 108 to facilitate one or more games of chance or skill and produce interactions between the player 112 and the game of chance or skill. In some embodiments, the game instruction set 420 may include subroutines that present one or more graphics to the player 112 via the user interface 416, subroutines that calculate whether a particular wager has resulted in a win or loss during the game of chance or skill, subroutines for determining payouts for the player 112 in the event of a win, subroutines for exchanging communications with a connected server (e.g., a server of the back-betting system 116 and/or a server of the wagering system 160), subroutines for enabling the player 112, 204 to engage in a game using their computational device 152, and any other subroutine or set of instructions that facilitate gameplay at or in association with the EGM 108.

The wager credit meter 424 may correspond to a secure instruction set and/or data structure within the EGM 108 that facilitates a tracking of activity at the EGM 108. In some embodiments, the wager credit meter 424 may be used to store or log information related to various player 112 activities and events that occur at the EGM 108. The types of information that may be maintained in the wager credit meter 424 include, without limitation, player information, available credit information, wager amount information, and other types of information that may or may not need to be recorded for purposes of accounting for wagers placed at the EGM 108 and payouts made for a player 112, 204 during a game of chance or skill played at the EGM 108. In some embodiments, the wager credit meter 424 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the EGM 108, and the like. In some embodiments, certain portions of the wager credit meter 424 may be updated in response to outcomes of a game of chance or skill played at the EGM 108. Some or all of the data within the wager credit meter 424 may be reported to the wagering system 160 and/or back-betting system 116, for example, if such data applies to a centrally-managed game involving a progressive prize pool. As an example, the number, value, and timing of wagers placed by a particular player 112 and payouts on such wagers may be reported to the wagering system 160. Likewise, status of the wager credit meter 424 may be reported to the back-betting system 116 if such information relates to a back-bet placed by a back-betting player 208.

The device association instruction set 428, when executed by the processor 404, may enable the EGM 108 to create an association with a computational device 152, perhaps for the purposes of establishing a back-betting session with the computational device 152. In some embodiments, the device association instruction set 428 is configured to pair with a computational device 152 and possibly establish a communication link 228, such as a Bluetooth, BLE, WiFi, or NFC communication link. The device association instruction set 428 may also include instructions for discontinuing an association with a computational device 152. For example, the device association instruction set 428 may be configured to unpair or disassociate the EGM 108 from the computational device 152 when it is determined that a back-betting session should come to a conclusion. In some embodiments, the device association instruction set 428 may be configured to operate a device interface 456, which may be similar to device interface 212. For instance, the device association instruction set 428 may be configured to enable the device interface 456 to pair with a corresponding device interface of the computational device 152 and to exchange communications over the communication channel established between the devices. As a non-limiting example, the device interface 456 may include a wireless antenna and the device association instruction set 428 may include a driver for the antenna and instructions that enable the exchange of communications with the antenna.

The back-bet coordination instruction set 432, when executed by the processor 404, may enable the EGM 108 to establish and manage back-betting sessions with one or multiple computational devices 152. The back-bet coordination instruction set 432 may also be configured to determine whether an event at the EGM 108 relates to a back-bet placed during a back-betting session and, if such a determination is made, then report state-of-play information regarding that event to the back-betting system 116 and/or computational device 152, as appropriate. The back-bet coordination instruction set 432 may also be responsible for synchronizing back-bet wagers placed at a computational device 152 with respect to a game being played at the EGM 108, for example, to ensure that such back-bet wagers are timely placed with respect to the timing of game events at the EGM 108. The back-bet coordination instructions 432, in some embodiments, may be configured to cooperate with the back-bet management instruction set 140 maintained at the back-betting system 116. In embodiments where the EGM 108 operates as a central manager of a back-betting session, then it may be desirable to also enable some functions of the back-bet management instructions 140 in the back-bet coordination instructions 432.

The back-bet credit meter(s) 436 may be used to manage or track a status of back-bets placed during back-betting sessions that involve the EGM 108. In some embodiments, the back-bet credit meters 436 may include one or more of a credit meter that: transfers credits onto the EGM 108 for back-bets; transfers credits off the EGM 108 associated with back-bets; a credit meter to hold funds associated with transfers onto the EGM 108, or wins associated with back-bets; a meter for wagers associated with back-bets; and a meter for game awards associated with back-bets. It should be appreciated that the back-bet credit meter(s) 436 may be managed on a per-EGM basis or on a per-back-better basis.

Because the EGM 108 may be used for the acceptance and issuance of tickets/vouchers, the EGM 108 may be provided with appropriate hardware to facilitate such acceptance and issuance. Specifically, the EGM 108 may be provided with a ticket acceptance device 444 that is configured to accept or scan physically-printed tickets/vouchers and extract appropriate information therefrom. In some embodiments, the ticket acceptance device 444 may include one or more machine vision devices (e.g., a camera, IR scanner, optical scanner, barcode scanner, etc.), a physical ticket acceptor, a shredder, etc. The ticket acceptance device 444 may be configured to accept physical tickets and/or electronic tickets without departing from the scope of the present disclosure. An electronic ticket/voucher may be accepted by scanning a barcode or QR code displayed by a player's 112 computational device 152, for example.

The ticket issuance device 440 may be configured to print or provide physical tickets/vouchers to players 112. In some embodiments, the ticket issuance device 440 may be configured to issue a ticket/voucher consistent with an amount of credit available to a player 112, possibly as indicated within the wager credit meter 424.

The cash in device 448 may include a bill acceptor, a coin acceptor, a chip acceptor, or the like. In some embodiments, the cash in device may also include credit card reader hardware and/or software. The cash out device 452, like the ticket issuance device 440, may operate and issue cash, coins, tokens, or chips based on an amount indicated within the wager credit meter 424. In some embodiments, the cash out device 452 may include a coin tray or the like and counting hardware configured to count and distribute an appropriate amount of coins or tokens based on a player's 112 winnings or available credit within the wager credit meter 424.

The EGM 108 is also shown to include a substantially unique code 460 printed thereon or displayable by the user interface 416 of the EGM 108. In some embodiments, the substantially unique code 460 may be used as a mechanism for pairing or associating the EGM 108 with a computational device 152 for purposes of establishing a back-betting session. In some embodiments, the substantially unique code 460 may correspond to a QR code, barcode, or the like that substantially uniquely identifies the EGM 108 from among other EGMs in the gaming system 100. Information contained in the substantially unique code 460 may be used by a computational device 152 to establish a back-betting session by, for example, identifying the EGM 108 to the back-betting system 116. In some embodiments, the substantially unique code 460 may not be a printed or visible code, but rather may be an electronic code that is communicated to the computational device 152 via a proximity-based communication protocol (e.g., NFC, Bluetooth, BLE, etc.).

Figure 5:
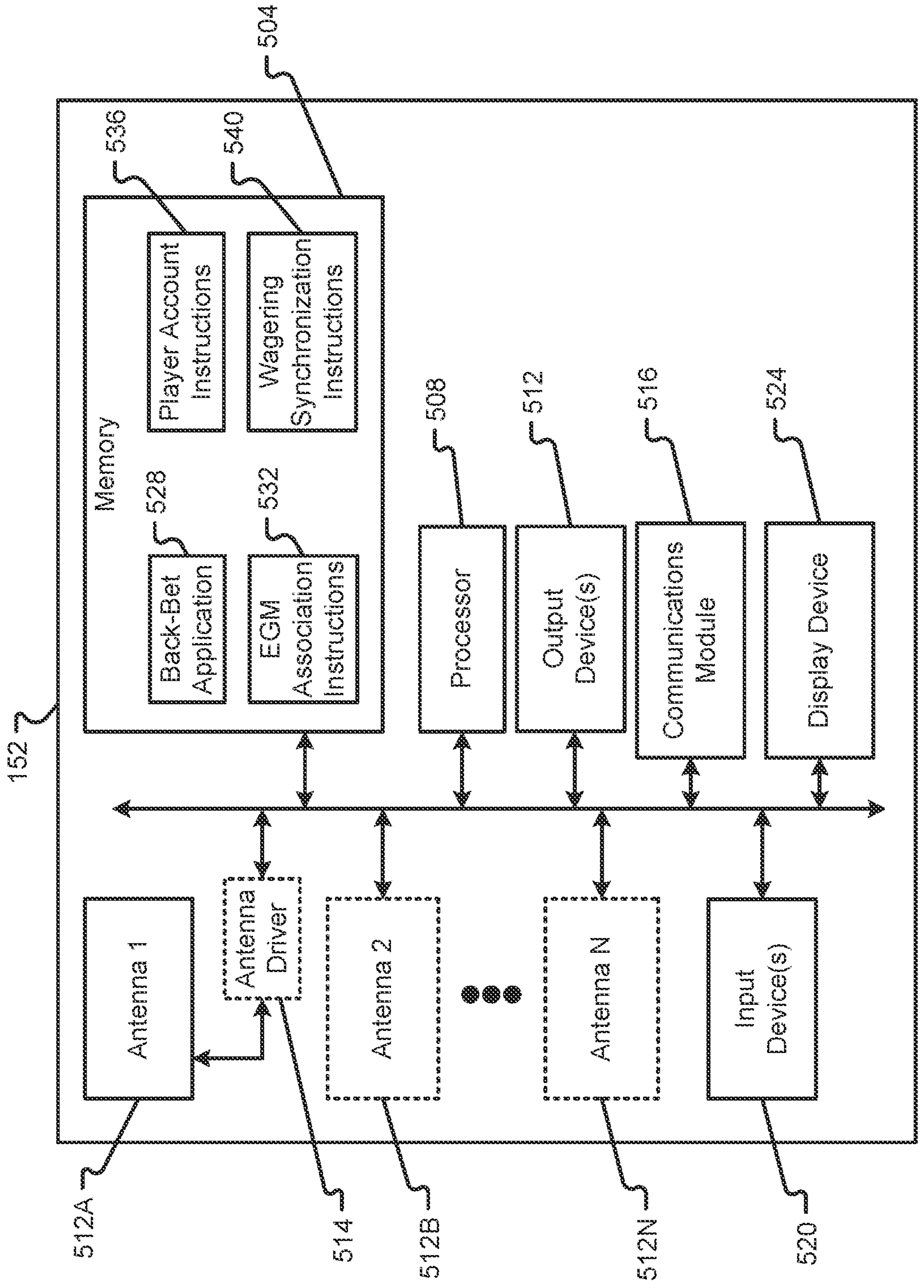
FIG. 5 is a block diagram depicting an illustrative user computational device in accordance with embodiments of the present disclosure.

With reference now to FIG. 5, additional details of a computational device 152 will be described in accordance with at least some embodiments of the present disclosure. The computational device 152 may include one or more components, such as, a memory 504, a processor 508, an antenna 512A-N, a communications module 516, one or more input devices 520, and one or more display devices 524. In some embodiments, the computational device 152 may further include a power module.

The memory 504 of the computational device 152 may be used in connection with the execution of application programming or instructions by the processor 508, and for the temporary or long-term storage of program instructions and/or data. The memory 504 may contain executable functions that are used by the processor 508 to run other components of the computational device 152. In one embodiment, the memory 504 may be configured to store various instruction sets that are executable by the processor 508. Examples of such instruction sets include, without limitation, a back-bet application 528, an EGM association instruction set 532, a player account instruction set 536, and a wagering synchronization instruction set 540.

The back-bet application 528, when executed by the processor 508, may enable a back-betting player 208 to engage in back-betting sessions, place back-bet wagers, receive state-of-play information from the EGM 108, communicate with the back-betting system 116, and the like. In some embodiments, the back-betting application 528 may enable the establishment of a back-betting session between the user computational device 152 and a back-betting system 116 when the user computational device 152 is associated with an asset of the gaming system (e.g., an EGM 108). The back-bet application 528 may further enable exchange of back-bet wager information via the back-betting system 116 and restrict the placement of back-bets with the back-betting system 116 when the user computational device 152 is not associated with the asset of the gaming system.

Some of the above-described functionality of the back-bet application 528 may be facilitated by cooperation with the EGM association instruction set 532. In some embodiments, the association instruction set 532 may enable the user computational device 152 to be associated with and dissociated from an EGM 108 or the like. In some embodiments, the association instruction set 532 may be similar to the device association instruction set 428 and may be configured to exchange communications with the EGM 108 by establishing a wireless communication link between the computational device 152 and EGM 108. In other embodiments, the association instructions 532 may be configured to operate an input device 520 (e.g., a camera or image capture device) to obtain information provided by the substantially unique code 460. The association instruction set 532 may further be configured to enable the computational device 152 to report an association with an asset, such as an EGM 108, to the back-betting system 116 for purposes of establishing and maintaining a back-betting session with respect to the EGM 108.

The player account instruction set 536, when executed by the processor 508, may enable the computational device 152 to manage a player account that belongs to the owner of the computational device 152. For instance, the player account instruction set 536 may be configured to manage a player loyalty account, manage available wager credits for a player within the player loyalty account, and manage other cashless wagering functions for the player. In some embodiments, the player account instruction set 536 may be configured to update a player account based on direct wager activity with an asset, such as an EGM 108, as well as back-betting activity.

The wagering synchronization instruction set 540, when executed by the processor 508, may enable the computational device 152 to ensure back-bet wagers made at the computational device 152 are timely made with respect to game events at the EGM 108. In some embodiments, the wagering synchronization instruction set 540 may have access to state-of-play information from the EGM 108. Such state-of-play information may be received directly from the EGM 108 or via the back-betting system 116. In some embodiments, the wagering synchronization instruction set 540 may be configured to access a clock of the user computational device 152 (e.g., a clock within the processor 508) and determine a time when a back-bet wager is placed with respect to an event of the asset. This information may be communicated to the back-bet application 528 to ensure that the back-bet is timely made.

In some embodiments, the memory 504 may comprise volatile or non-volatile memory and a controller for the same. Non-limiting examples of memory 504 that may be utilized in the computational device 152 include RAM, ROM, buffer memory, flash memory, solid-state memory, or variants thereof.

The processor 508 may correspond to one or many microprocessors that are contained within the housing of the computational device 152 with the memory 504. In some embodiments, the processor 508 incorporates the functions of the user device's Central Processing Unit (CPU) on a single Integrated Circuit (IC) or a few IC chips. The processor 508 may be a multipurpose, programmable device that accepts digital data as input, processes the digital data according to instructions stored in its internal memory, and provides results as output. The processor 508 implements sequential digital logic as it has internal memory. As with most known microprocessors, the processor 508 may operate on numbers and symbols represented in the binary numeral system.

The one or more antennas 512A-N may be configured to enable wireless communications between the computational device 152 and an EGM 108, a wearable device, and/or some other device. As can be appreciated, the antenna(s) 512A-N may be arranged to operate using one or more wireless communication protocols and operating frequencies including, but not limited to, Bluetooth®, BLE, NFC, ZigBee, GSM, CDMA, WiFi, RF, and the like. By way of example, the antenna(s) 512A-N may be RF antenna(s), and as such, may transmit RF signals through free-space to be received by an EGM 108 having an RF transceiver in the form of the device interface 456. One or more of the antennas 512A may be driven or operated by a dedicated antenna driver 514.

In some embodiments, the computational device 152 may include a power module. The power module may be configured to provide power to the parts of the computational device 152 in order to operate. The power module may store power in a capacitor of the power module. In one embodiment, electronics in the power module may store energy in the capacitor and turn off when an RF field is present. This arrangement can ensure that energy is presented to the computational device 152 minimizing any effect on read distance. For example, the power module may include a battery or other power source to supply power to parts of the computational device 152. The power module may include a built-in power supply (e.g., battery) and/or a power converter that facilitates the conversion of externally-supplied AC power into DC power that is used to power the various components of the computational device 152. In some embodiments, the power module may also include some implementation of surge protection circuitry to protect the components of the computational device 152 from power surges.

The computational device 152 may include a communications module 516 that is configured to communicate with one or more different systems or devices either remote or local to the computational device 152. Thus, the communications module 516 can send or receive messages to or from servers, EGMs 108, other computational devices 152, or any other network-connected device.

The input device(s) 520 may include at least one device sensor. Among other things, a device sensor may be configured to detect a state of the computational device 152 or location of the computational device 152. In some embodiments, the input device(s) 520 may also include an image capture device, such as a camera, that is configured to capture an image of an optical code 460 provided on an EGM 108.

In some embodiments, the computational device 152 may include a user interface. The user interface may or may not include one or more input devices 520, output devices 512, and/or display devices 524. Examples of suitable user input devices that may be included in the user interface include, without limitation, buttons, keyboards, mouse, touch-sensitive surfaces, pen, camera, microphone, etc. Examples of suitable user output devices and/or display devices that may be included in the user interface include, without limitation, display screens, touchscreens, lights, speakers, etc. It should be appreciated that the user interface may also include a combined user input and user output device, such as a touch-sensitive display or the like.

The network interface may comprise hardware that facilitates communications with other communication devices over the communication network 104. The network interface may include an Ethernet port, a Wi-Fi card, a Network Interface Card (NIC), a cellular interface (e.g., antenna, filters, and associated circuitry), or the like. The network interface may be configured to facilitate a connection between the computational device 152 and the communication network 104 and may further be configured to encode and decode communications (e.g., packets) according to a protocol utilized by the communication network 104.

Figure 6:
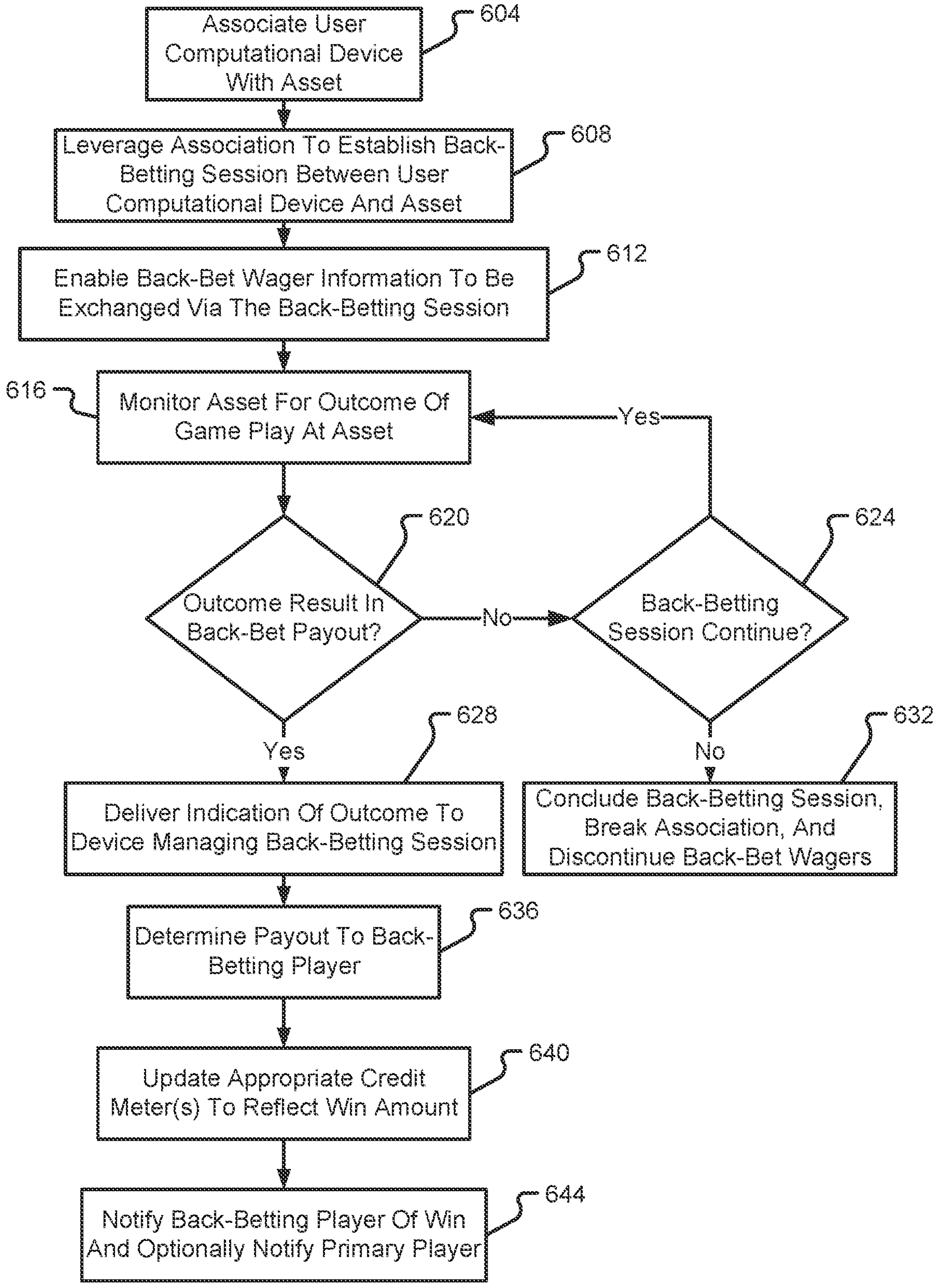
FIG. 6 is a flow diagram depicting a back-betting method in accordance with embodiments of the present disclosure.

With reference now to FIG. 6, a first back-betting method will be described in accordance with at least some embodiments of the present disclosure. The method begins when a computational device 152 is associated with an asset of a gaming system (step 604). In some embodiments, the asset corresponds to an EGM 108, a table game 156, or the like. In some embodiments, the association may be established between the computational device 152 and a primary gambling player at an asset, but at least some information from the asset being played by the primary gambling player may be included to create the association. In some embodiments, the association may be achieved by pairing the computational device 152 with a device interface 212, 456 of the EGM 108. Such a pairing may be achieved using Bluetooth, BLE, NFC, WiFi, or any other proximity-based communication protocol.

The method continues by leveraging the association established in step 604 to establish a back-betting session between a user of the computational device 152 and the asset (step 608). In some embodiments, the user of the computational device 152 involved in the back-betting session may be considered a back-betting player 208. This particular player may or may not also be a primary gambling player 204. In some embodiments, establishment of the back-betting session may be achieved via direct communications between the computational device 152 and back-betting system 116. In some embodiments, establishment of the back-betting session may be achieved via communications between the computational device 152 and asset/EGM 108 or by communications that flow through the EGM 108 to the back-betting system 116.

The method continues by enabling the exchange of back-bet wager information via the back-betting session (step 612). In some embodiments, the exchange of back-bet wager information may include a presentation of available back-bets to the computational device 152, a presentation of odds for available back-bets, placement of back-bet wagers made at the computational device 152, timing of such back-bet wagers, an exchange of state-of-play information between the various devices involved in the back-betting session, and so on. As a game at the asset continues, the game itself may be monitored for an outcome (step 616). The outcome of the game may be monitored, in some embodiments, to determine if a back-bet associated with the game is resulting in a payout (step 620). If this query is answered negatively, then the method continues as long as the back-betting session continues (step 624). Once the back-betting session is completed as determined at step 624, the back-betting session will be concluded, the association between the computational device 152 and asset may be broken, and the back-betting system may discontinue accepting back-bet wagers from the now-disassociated computational device 152 (step 632).

Referring back to step 620, if the outcome of the game is determined to result in a back-bet payout, then the method will continue by delivering an indication of the game outcome to the device managing the back-betting session (step 628). In some embodiments, the device managing the back-betting session may correspond to the asset at which the game is being played, a back-betting system 116, the computational device 152, or a combination thereof.

The method further continues by determining the payout to make to the back-betting player based on the amount of the back-bet wager, the nature of the event that resulted in the payout, and whether other players are also being paid on the same event via a different back-betting session (step 636). In some embodiments, a back-betting player may be paid back-bet winnings from a back-bet prize pool 324. In some embodiments, a payout based on the back-bet placed by the back-betting player may also be made to the primary gambling player and such a payout may be made from the back-bet prize pool 324 or the wagering prize pool 320.

The method then continues by updating the appropriate credit meter(s) within the gaming system 100 to reflect the win amount (step 640). In some embodiments, credit meter(s) may be updated to reflect both the payout to the primary gambling player and the payout to any back-betting players. The credit meter(s) that are updated may correspond to credit meter(s) maintained at an EGM 108, credit meter(s) maintained at the back-betting system 116, credit meter(s) maintained at the wagering system 160, credit meter(s) maintained at a computational device 152, or combinations thereof. The method may then continue by notifying the back-betting player of the win and optionally notifying the primary gambling player of the back-betting player's win (step 644). The notification to the back-betting player may be achieved by the computational device 152 whereas the notification to the primary gambling player may be made via the asset being played by the primary gambling player. In some embodiments, the decision of whether or not to notify the primary gambling player may be controlled by notification rules and/or preferences defined for the back-betting session.

Figure 7:
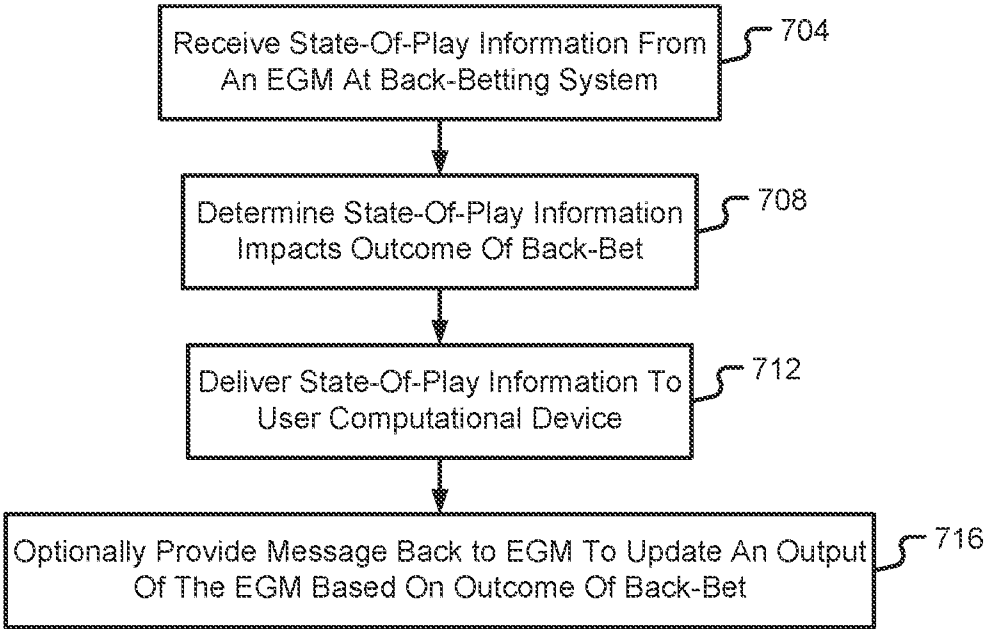
FIG. 7 is a flow diagram depicting another back-betting method in accordance with embodiments of the present disclosure.

With reference now to FIG. 7, another back-betting method will be described in accordance with at least some embodiments of the present disclosure. The method begins when state-of-play information is received at a back-betting system 116 from an EGM 108 (step 704). In some embodiments, the state-of-play information may include any information related to events at the EGM 108, a series of events at the EGM 108, or the like. In an alternative configuration, the state-of-play information may be communicated to the back-betting system 116 from the wagering system 160.

The method continues with the back-betting system 116 determining if the state-of-play information impacts an outcome of any pending or outstanding back-bets (step 708). In response to determining that an outcome of an outstanding back-bet has been impacted the back-betting system 116 may determine that some of the state-of-play information is to be delivered to the computational device 152 on which the back-bet was placed. In response, the back-betting system 116 may deliver the appropriate or relevant state-of-play information to the computational device 152 (step 712). In some embodiments, the state-of-play information may be communicated to the computational device 152 while bypassing the EGM 108. In some embodiments, the state-of-play information may be communicated to the computational device 152 via the EGM 108, either directly or by the back-betting system 116 communicating through the EGM 108 with the computational device 152.

The method then continues by optionally providing a message or communication back to the EGM 108 to update an output of the EGM 108 based on the outcome of the back-bet (step 716). In some embodiments, the decision to message the EGM 108 and provide a notification to the primary gambling player may be controlled by back-betting rules and/or preferences. Such rules and preferences may be controllable by the back-betting player, the primary gambling player, the EGM 108, the computational device 152, the back-betting system 116, combinations thereof, or the like. Such rules and preferences may be modifiable or set to default values.

Figure 8:
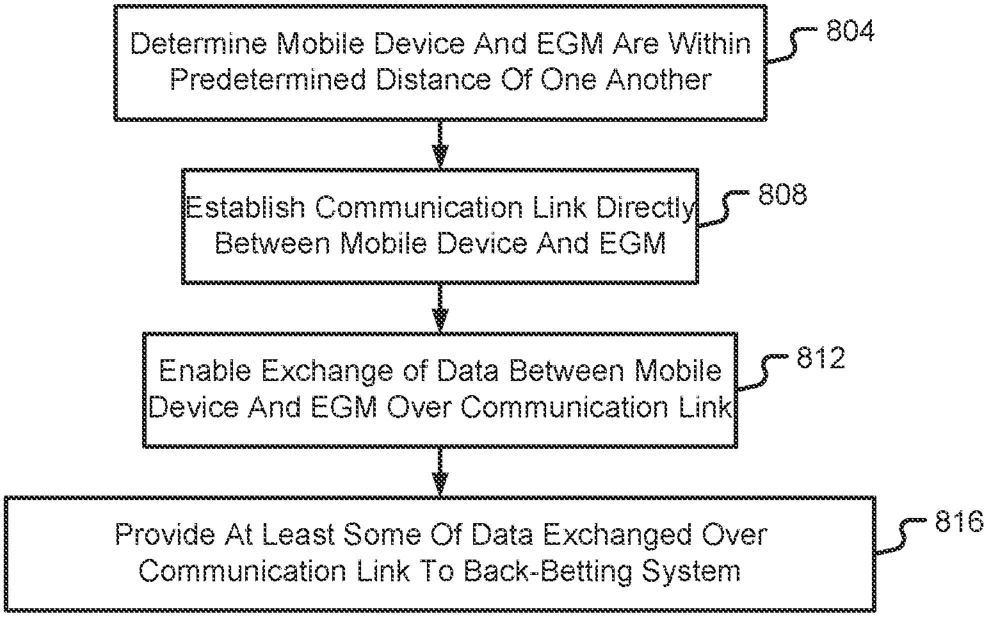
FIG. 8 is a flow diagram depicting another back-betting method in accordance with embodiments of the present disclosure.

With reference now to FIG. 8, another back-betting method will be described in accordance with at least some embodiments of the present disclosure. The method begins by determining that a computational device 152, such as a mobile device, and an asset, such as an EGM 108, are within a predetermined distance of one another (step 804). This may be determined automatically in response to the devices being brought within a wireless communication range of one another and/or by independently tracking a location of the devices 152, 108 and then determining that the locations are within a predetermined distance of one another. In other embodiments, this step may be performed when the mobile device is brought within range of the EGM 108 sufficient to enable the mobile device to capture an image of the EGM's 108 substantially unique code 460.

The method continues by establishing a communication link directly between the mobile device and EGM 108 (step 808). The communication link established between the devices may utilize to a proximity-based communication protocol and may be established automatically when the devices are brought within a predetermined distance of one another. Alternatively, this step may be performed when the mobile device obtains the substantially unique optical code 460 and then uses information therefrom to establish a communication link with the EGM 108.

Once the communication link is established, the method continues by enabling an exchange of data between the mobile device and the EGM 108 over the communication link (step 812). In some embodiments, back-bet wager information and/or state-of-play information may be exchanged over the communication link. It should be appreciated that other types of data may be exchanged over the communication link such as back-bet wagers placed by the mobile device. In some embodiments, the devices may exchange clock or timer information from their respective clocks to help facilitate the synchronization and enforcement of back-bets placed at the mobile device with respect to the EGM 108.

The method then continues by providing at least some of the data exchanged over the communication link to the back-betting system 116 (step 816). In some embodiments, the EGM 108 may take information received over the communication link and forward the information to the back-betting system 116. In some embodiments, the mobile device may take information received over the communication link and forward the information to the back-betting system 116. This distribution of information to the back-betting system 116 can help the back-betting system manage a back-betting session between the mobile device and EGM.

Figure 9:
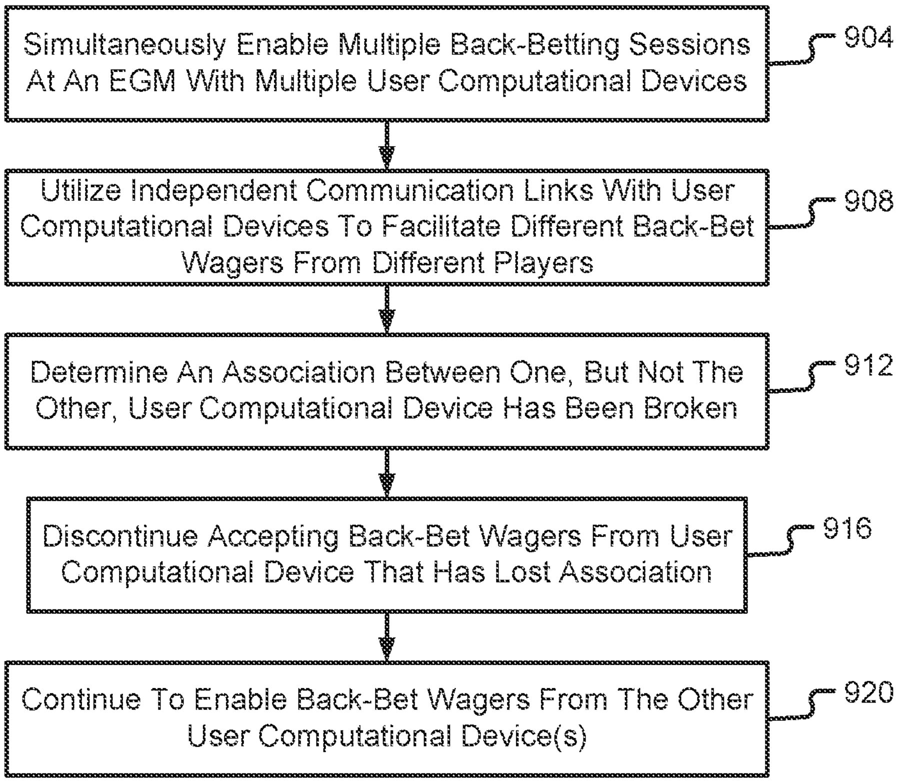
FIG. 9 is a flow diagram depicting another back-betting method in accordance with embodiments of the present disclosure.

With reference now to FIG. 9, another back-betting method will be described in accordance with at least some embodiments of the present disclosure. The method begins by allowing an EGM 108 to simultaneously having multiple back-betting sessions associated therewith (step 904). The multiple back-betting sessions may be established by different back-betting players using different computational devices 152 or by a single back-betting player using different computational devices 152. The establishment of the various back-betting sessions may be enabled using any of the methods disclosed herein.

The method continues by enabling the EGM 108 to utilize independent communication links with the different computational devices 152 to manage the back-betting sessions (step 908). In some embodiments, each computational device 152 may use its independently-established communication link to manage the back-betting session for that computational device 152. In some embodiments, each computational device 152 may submit its own back-bet wager information to the EGM 108 via its unique communication link and each computational device 152 may receive state-of-play information that is specific to back-bets placed at the computational device 152, which may be the same or different from other back-bets placed by other computational devices 152.

The method continues with one computational device 152 breaking its association with the EGM 108 (step 912). This may occur without other computational devices 152 breaking their association with the same EGM 108. In some embodiments, when this occurs, the EGM 108 and/or back-betting system 116 may discontinue accepting back-bet wagers for the computational device 152 that has ended its association with the EGM 108 (step 916). Meanwhile, back-bet wagers from other computational devices 152 that are still associated with the EGM 108 may be accepted and winnings from such back-bet wagers may be applied to the back-betting players that hold the computational devices 152 (step 920).

Figure 10:
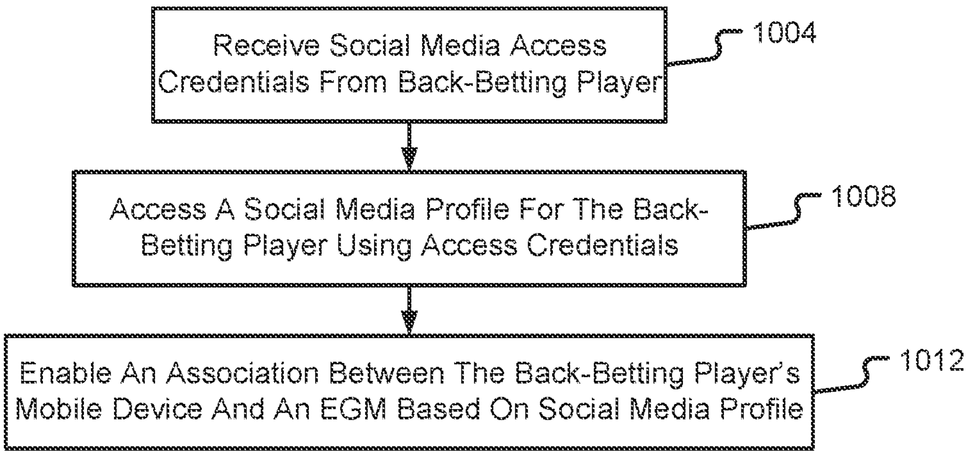
FIG. 10 is a flow diagram depicting another back-betting method in accordance with embodiments of the present disclosure.

With reference now to FIG. 10, another back-betting method will be described in accordance with at least some embodiments of the present disclosure. The method begins with the back-betting system 116 receiving social media access credential from a back-betting player (step 1004). The social media credentials received in this step may include username and/or password information for the back-betting player's social media profile.

The method may continue with the back-betting system accessing the social media profile, or a variant thereof, for the back-betting player by using the credentials received in step 1004 (step 1008). In some embodiments, the accessing may include sending a request for authentication from the back-betting system 116 to the associated social media website seeking a confirmation that the back-betting player has provided a valid set of social media credentials. The back-betting system 116 may or may not actually be provided with full access to the back-betting player's social media profile, but rather may simply receive an approved or disapproved confirmation back from the social media website.

The method then continues if the social media site provides the back-betting system 116 with a confirmation that valid credentials have been received. Specifically, the method may involve leveraging the confirmation to establish an association between the back-betting player's computational device 152 and an asset in the gaming system 100 (step 1012). For instance, the computational device 152 and asset may be configured to associate with one another after verification of the player's social media credentials such that a back-betting session can be established between the computational device 152 and asset.

Figure 11:
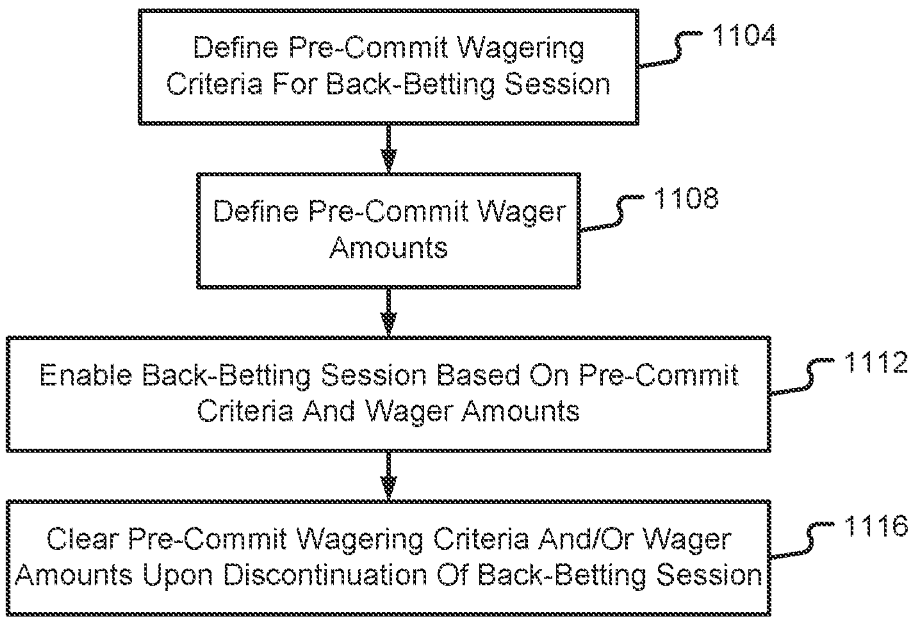
FIG. 11 is a flow diagram depicting another back-betting method in accordance with embodiments of the present disclosure.

With reference now to FIG. 11, another back-betting method will be described in accordance with at least some embodiments of the present disclosure. The method may include a pre-commit back-betting method in some embodiments. In the depicted embodiment, the method begins by defining pre-commit wagering criteria for a back-betting session between a computational device 152 and asset, such as an EGM 108 (step 1104). As a non-limiting example, the back-betting player may be allowed to pre-authorize matching the primary gambling player's wagers until one or more of the following criteria have been met:

A maximum period of time has elapsed

Up to a maximum wager amount

Up to a maximum number of game cycles have occurred

Until a certain win or loss threshold has been reached

The primary gambling player on the EGM ends their session

Loss of pairing or association with the EGM

Bet (or modify bet) on a certain condition (e.g., place a back-bet when a game loses 3× in a row)

It is also possible for wagers and wins to be scaled. Thus, the method may also include defining pre-commit wager amounts, whether the same or different from wager amounts placed by the primary gambling player (step 1108). For instance, a back-betting player could define pre-commit wager amounts to be ½ of the wager placed by the primary gambling player on the base game, and the winning could be scaled based upon various criteria. For example, scaled math models specific to the base game could be published. Alternatively or additionally, the award amount could equal the scaling of the back-bet wager.

The method will then continue by enabling a back-betting session based on the pre-commit criteria and/or the pre-commit wager amounts defined in steps 1104 and 1108 (step 1112). These pre-commit wager criteria and/or wager amounts may continue to be enforced for additional back-betting wagers as long as the back-betting session is maintained. Once the back-betting session is discontinued (e.g., via a predetermined event occurring, programmatically, or in response to the back-betting player discontinuing the back-betting session), the method may proceed by clearing the pre-commit wager criteria and/or wager amounts (step 1116).

Figure 12:
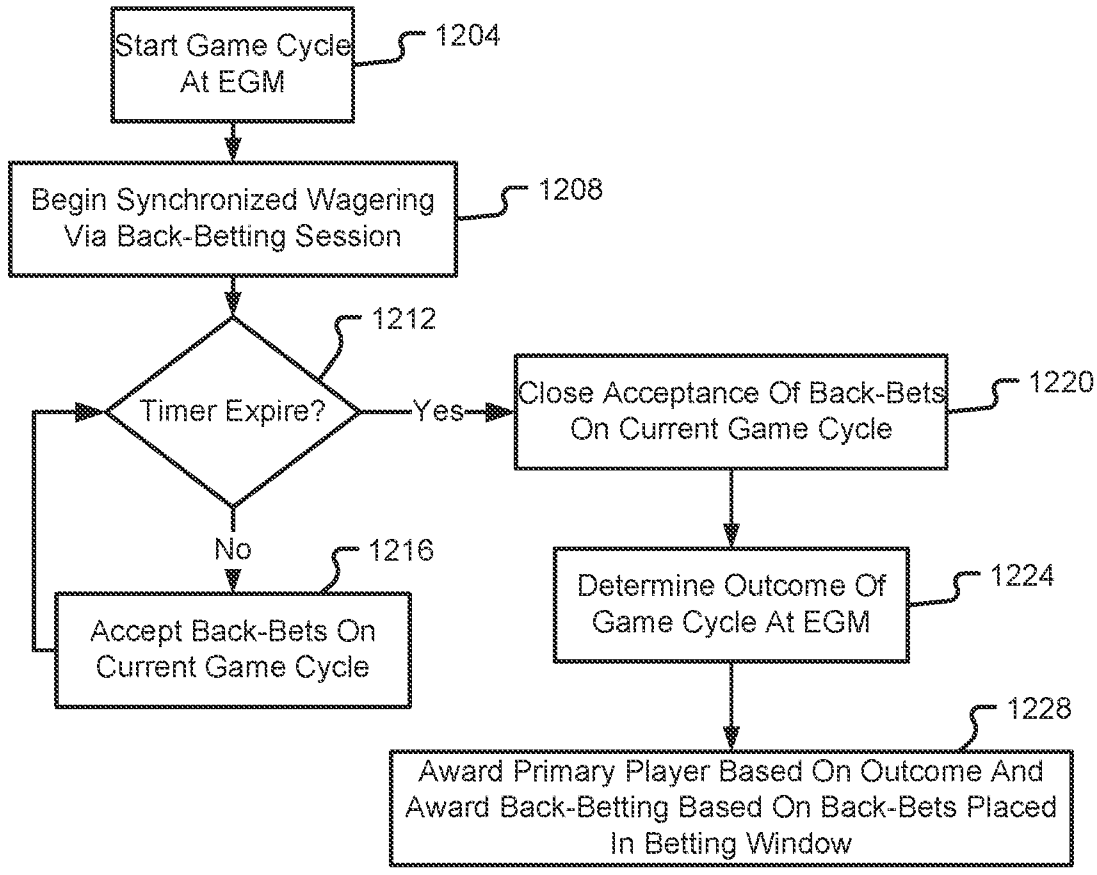
FIG. 12 is a flow diagram depicting another back-betting method in accordance with embodiments of the present disclosure.

With reference now to FIG. 12, another back-betting method will be described in accordance with at least some embodiments of the present disclosure. The method begins with an EGM starting a game cycle for a particular game of chance or skill being played by a primary gambling player (step 1204). The method continues with a back-betting session synchronizing itself with the in-progress game cycle (step 1208). In some embodiments, the primary gambling player on the base game can start a game cycle, and there is a small period time where back-betting players can place their back-bet wager before winnings are shown on the EGM 108. Accordingly, synchronization may begin after which point a timer starts to count for a predetermined period of time (step 1212). If a back-betting player does not place their back-bet wager within the pre-defined period of time, then they cannot partake in the winnings from the game cycle (step 1220). The timer may allow back-bets to be placed by one or a plurality of different back-betting players until the timer expires (step 1216).

Once the timer expires, the back-betting players will not be allowed to place a back-bet on the in-process game cycle whereas other back-betting players will be allowed to partake in back-bet winnings if the primary gambling player wins. This model may allow for back-bet wagers that do not match the wager placed by the primary gambling player placing the initial wager on the EGM 108. Accordingly, the method may continue by determining an outcome of the in-process game (step 1224) and then awarding players based on the outcome (step 1228). The primary gambling player may be awarded based on their wager placed directly with the EGM 108 whereas the back-betting players may be awarded based on the amount of their back-bet wagers. Accordingly, players placing back-bets could possibly select different wagering parameters, including, but not limited to: number of lines and/or bet per line.

In some embodiments, it may be possible for the back-betting players to be awarded game outcomes that the primary gambling player is not eligible for. In the case of a game outcome that requires the state of the game to uniquely change, such as hitting a top award, winning a progressive, or entering an in-game bonus (e.g., free spins, pick X or Y bonus, etc.), the base game may transition to the appropriate state. In this case, the reward from this additional state may be awarded to: (i) The back-betting player only, and the primary gambling player of the EGM 108 does not get any additional award or (ii) the winnings can be split in some equitable fashion between the primary gambling player and the back-betting player(s).

In another embodiment, the primary gambling player on the EGM 108 could ensure that all allowed back-betting players are betting some minimum bet level. The effect of the primary gambling player controlling the minimum bet level could have the effect of, but not limited to, better compensation to the primary gambling player or could affect eligibility to a particular bonus or prize.

If multiple EGM award triggers are encountered on the base game based upon the total bets from back-betting players and the primary gambling player, then the EGM 108 may take another action. For example, the EGM 108 may perform all transitions in an orderly fashion (e.g., play a free spin, play a pick X of Y bonus, hit a progressive, etc.). Alternatively or additionally, the EGM 108 may pick the transition which has the highest winning amount, best odds, or best risk/reward ratio.

Figure 13:
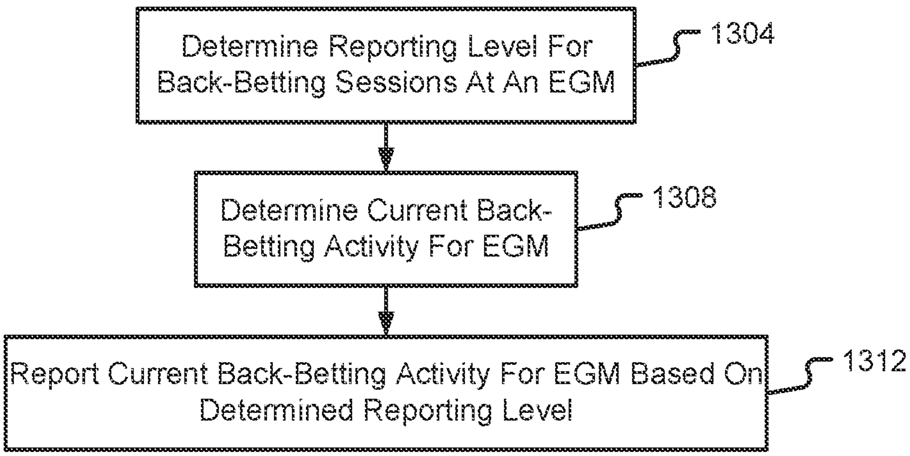
FIG. 13 is a flow diagram depicting another back-betting method in accordance with embodiments of the present disclosure.

With reference now to FIG. 13, another back-betting method will be described in accordance with at least some embodiments of the present disclosure. In some embodiments, back-betting can be performed anonymously meaning the primary gambling player will not know the identity of the back-betting player. In some embodiments, the primary gambling player may not even know that back-betting is occurring. Conversely, the primary gambling player may be presented information on the EGM 108 screen that would indicate back-betting was occurring on his/her game. Information could also be presented to the primary gambling player via the screen on the EGM 108 and it could specify the identity of the back-betting player or players. Alternatively, the primary gambling player may simply see a count of active back-betting players without being provided further information.

Accordingly, the method of FIG. 13 begins by determining a desired or allowable reporting level for back-betting sessions that are associated with an EGM 108 (step 1304). The reporting level may be predefined by the casino operator, by the back-betting player, or the primary gambling player. The reporting level may also be static or subject to change depending upon player preferences.

In some embodiments, the method continues by determining that a particular back-betting activity has occurred for the EGM 108 (step 1308). The method then continues with the EGM 108 and/or back-betting system 116 reporting the back-betting activity for the EGM 108 based on the determined reporting levels (step 1312). In some embodiments, the reporting may vary or be adjusted for the primary gambling player and/or for the back-betting player(s). For instance, reporting of back-betting information to other back-betting players may be controlled based on the determined reporting levels. Alternatively or additionally, reporting of back-betting information to the primary gambling player may be controlled based on the determined reporting levels.

While embodiments depicted and described herein have focused on back-betting on the game outcome, embodiments of the present disclosure are not so limited. Indeed, this particular application should not be construed as being limited o back-betting on a discrete game outcome. In some embodiments, a back-betting player could be allowed to back-bet on an event, a series of events, outcomes, or symbols at the EGM 108 resulting from the primary gambling player's play. This could include bets on but not limited to the following: (i) particular outcome or symbol or card; (ii) multiple losing outcomes in a row; and/or (iii) multiple winning outcomes in a row.

Figure 14:
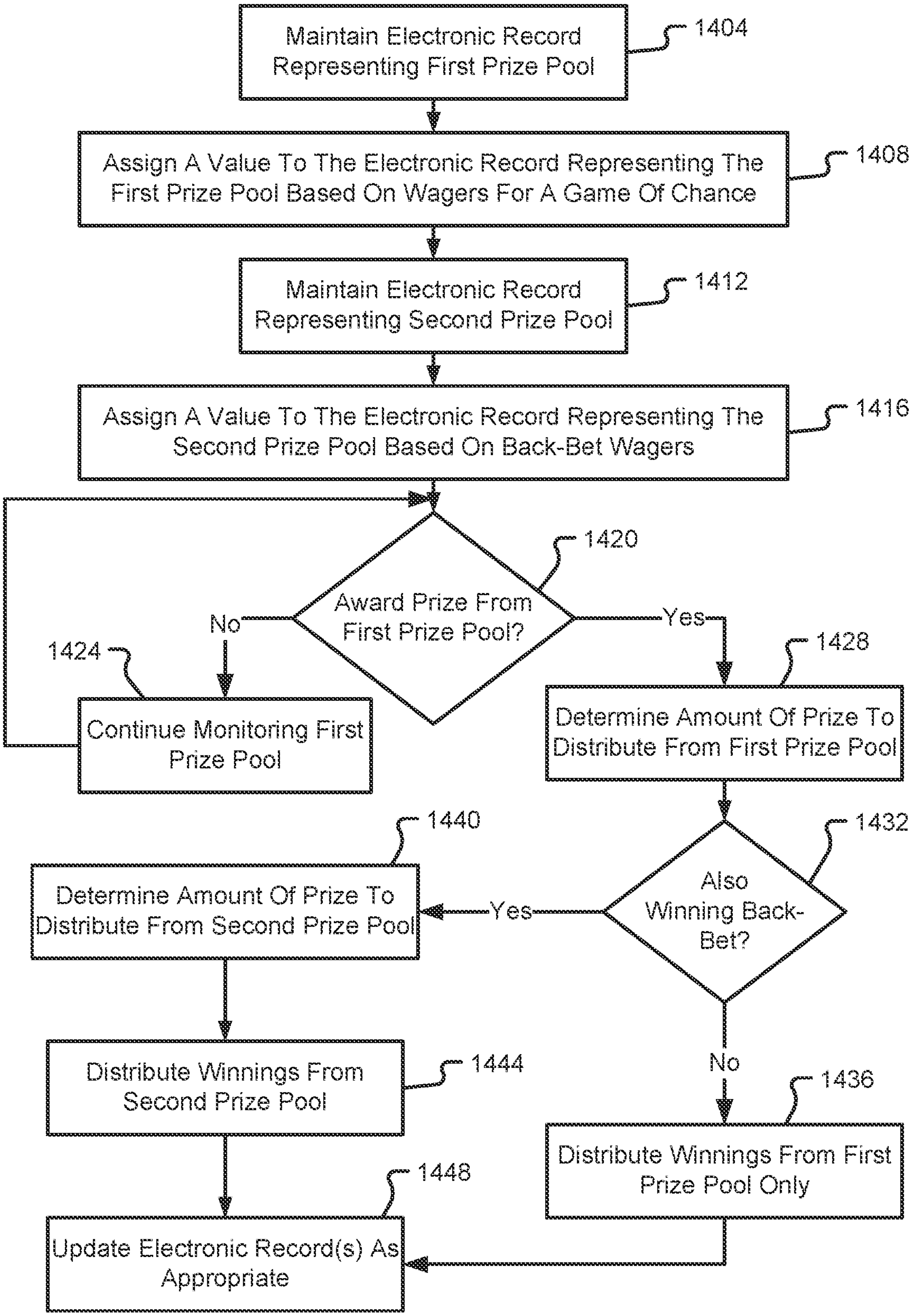
FIG. 14 is a flow diagram depicting another back-betting method in accordance with embodiments of the present disclosure.

With reference now to FIG. 14, another back-betting method will be described in accordance with at least some embodiments of the present disclosure. The method begins by enabling the wagering system 160 to maintain one or more electronic records representing a first prize pool (step 1404). In some embodiments, the first prize pool may correspond to a progressive prize pool and, more specifically, a wagering progressive prize pool 320. Thus, any primary gambling player that is directly playing 216 an EGM 108 may be eligible to win an award or distribution from the wagering progressive prize pool 320 if a game or chance or skill has a particular outcome for the primary gambling player and an appropriate wager was placed. In some embodiments, the first prize pool may be managed by a centralized server that is executing the wagering system 160. The electronic record for the first prize pool may be updated within an internal data structure of the server executing the wagering system 160 or the electronic record may be updated within a separate database used to manage progressive prize pools, for example.

The method may continue by assigning a value to the electronic record that represents the first prize pool based on wagers for a game or games of chance or skill (step 1408). In some embodiments, the first prize pool, in the form of the wagering prize pool 320, may have its value updated or incremented in response to wagers placed by primary gambling players 204 at EGMs 108. Of course, primary gambling players 204 may also be allowed to place direct wagers via the computational device 152 and win an award from the first progressive prize pool based on the wagers placed via the computational device 152.

The method continues with the back-betting system 116 maintaining an electronic record representing a second prize pool (step 1412). In some embodiments, the second prize pool may correspond to a back-bet progressive prize pool and, more specifically, the back-bet prize pool 324. Thus, back-betting players 208 may be allowed to place back-bets as discussed herein and win distributions from the back-bet progressive prize pool 324 if an appropriate back-bet is placed on an EGM 108 that is involved in a win from the wagering progressive prize pool 320.

The back-betting system 116 may also assign a value to the electronic record that represents the second prize pool based on back-bet wagers placed by back-betting players 208 (step 1416). In some embodiments, the entirety of back-bet wagers may be used to increment the value of the second prize pool whereas, in other embodiments, at least some portion of a back-bet wager may be used to increment the value of the first prize pool. The back-betting system 116 may maintain and update the electronic record within a data structure of a server executing the back-betting system 116. Alternatively, the electronic record for the value of the second prize pool may be maintained in a separate database.

The method continues with the wagering system 160 determining whether or not to award a prize from the first prize pool (step 1420). This decision may be made by a server executing the wagering system 160. In some embodiments, the decision of whether or not to award a prize from the first prize pool may depend upon whether or not a primary gambling player has placed a winning bet on a game of chance or skill with an EGM that is eligible to receive an award from the first prize pool. If this query is answered negatively, then the wagering system 160 will continue monitoring for events at EGMs 108 eligible to accept wagers for games that would ultimately distribute an award from the first prize pool (step 1424).

If the wagering system 160 determines that a primary gambling player has won a game or chance or skill from an EGM 108 and the winning results in an award distribution from the first prize pool, the method continues with the wagering system 160 determining an amount to distribute from the first prize pool (step 1428). The amount of the distribution from the first prize pool may depend upon the current value of the first prize pool (as determined in step 1408) and/or the amount of the wager placed by the primary gambling player. The amount of the distribution may also depend upon the number of winning bets (e.g., if there are more than one winning bets placed by a primary gambling player).

In response to determining that a primary gambling player has won a wager and is going to be awarded a distribution from the first prize pool, the method will continue with the back-betting system 116 determining if a back-bet wager existed for the winning wager placed by the primary gambling player (step 1432). In some embodiments, the wagering system 160 may communicate information about the win from the first prize pool to the back-betting system 116, which determines whether the winning EGM 180 was involved in a back-betting session and, if so, whether a back-bet was placed on the winning EGM 108. If no such back-bet was placed on the winning EGM 108 or if the winning EGM 108 was not involved in a back-betting session such that a computational device 152 could have placed a winning back-bet on the EGM 108, then awards will only be distributed from the first prize pool to the primary gambling player(s) (step 1436). Thereafter, appropriate electronic records for the first prize pool will be updated (e.g., decremented) to reflect the current value of the first prize pool (step 1448). In some embodiments, one or more credit meters in the winning EGM 108 and/or a credit meter at the wagering system 160 may also be updated to reflect the distribution of the award from the first prize pool.

Referring back to step 1432, if the back-betting system 116 also determines that a back-bet was placed on the winning EGM 108, then the back-betting system 116 may continue by determining an amount to distribute from the second prize pool to the back-betting player (step 1440). In some embodiments, the amount or size of the award distributed from the second prize pool may depend upon the size of the second prize pool, the size of the back-bet wager, how many winning back-bet wagers were placed on the winning EGM 108, etc. At least some of the distributions from the second prize pool may be made to the primary gambling player in addition to being distributed to the back-betting player (step 1444). In other embodiments, all of the distributions made from the second prize pool may only be made to the back-betting player whereas the primary gambling player only receives distributions from the first prize pool. The distributions may be made in the form of distributing physical tokens/chips, applying wager credits to the winning player's gaming account, printing of a voucher, or any other known distribution method. In some embodiments, the decision to distribute an award from the second prize pool may occur automatically through the cooperation of the wagering system 160 and back-betting system 116. Alternatively, at least some manual review or approval may be required before a distribution from either the first or second prize pool is allowed.

The method then continues to step 1448 where electronic records for the winning EGM 108 and electronic records for the winning back-bet(s) are updated. In some embodiments, the EGM 108 may have its credit meter also updated to record the winning back-bet. In some embodiments, a credit meter in the back-betting system 116 or in the computational device 152 may be updated to reflect the distribution.

Figure 15:
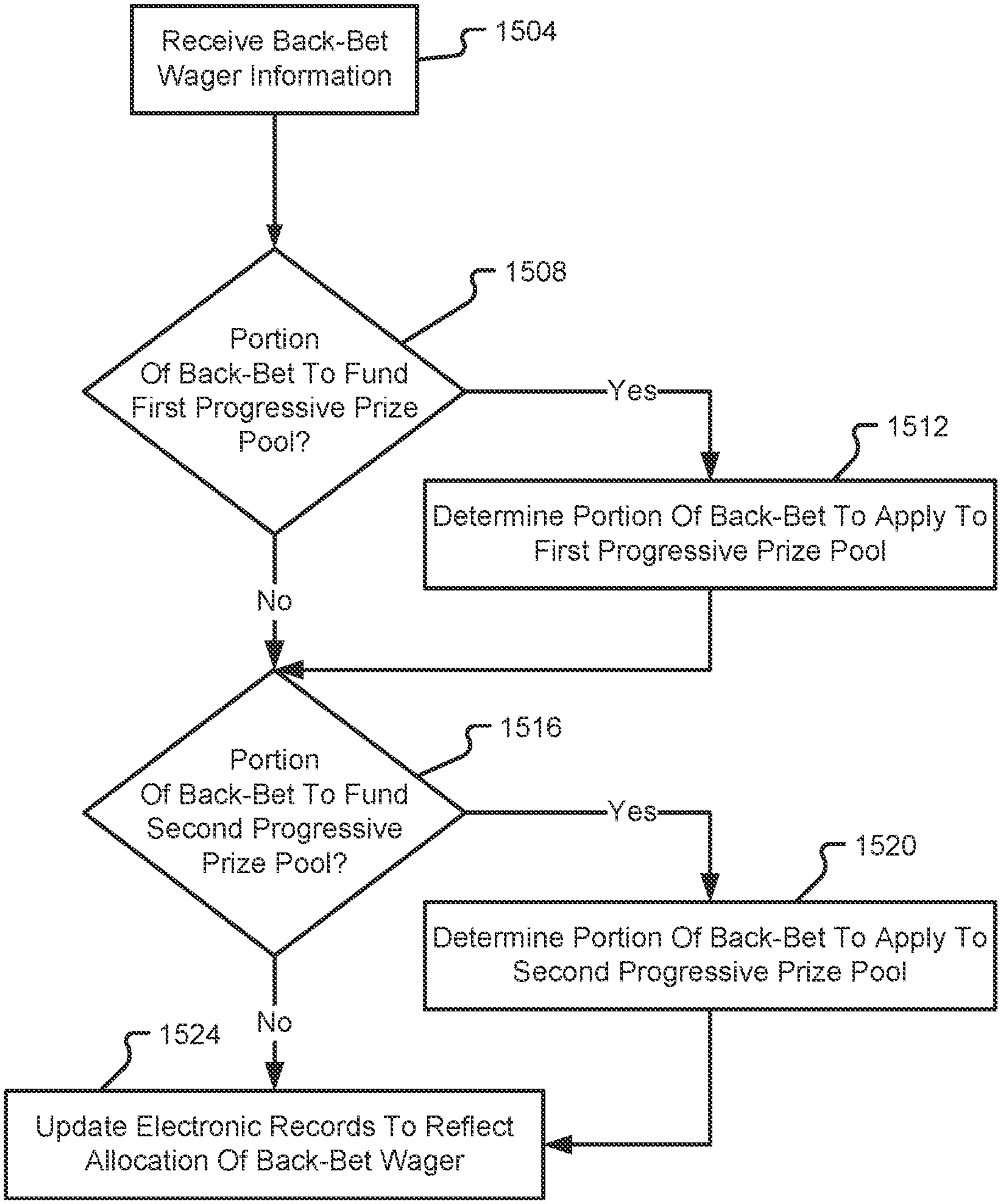
FIG. 15 is a flow diagram depicting another back-betting method in accordance with embodiments of the present disclosure.

With reference now to FIG. 15, another back-betting method will be described in accordance with at least some embodiments of the present disclosure. The method begins when back-bet wager information is received at the back-betting system 116 or any other device that is involved in the management of a back-betting session (step 1504). For instance, it may be possible to manage aspects of a back-betting session at the EGM 108, in which case the information regarding the back-bet wager could be received at the EGM 108. Further still, the information may be received at the wagering system 160, which may be responsible for updating electronic records associated with a wagering prize pool 320, such as a progressive prize pool. In some embodiments, the information may be received at multiple nodes in the gaming system 100.

The method continues by determining whether a portion of the back-bet will be used to fund a first progressive prize pool (step 1508). In some embodiments, the first progressive prize pool may correspond to the wagering prize pool 320 that is being used to award direct wagers placed at EGMs 108 in connection with games of chance or skill. If a portion of the back-bet wager is to be applied to the first progressive prize pool, then the method continues by determining the amount or value to be applied to the first progressive prize pool (step 1512). In some embodiments, the proportion of amount of a back-bet applied to the first progressive prize pool may correspond to a fixed amount, a fixed percentage, a variable amount, or a variable percentage. If the amount is variable, then appropriate inputs may be considered (e.g., preferences set by a primary gambling player, an amount of the primary wager made by the primary gambling player, etc.).

The method then continues by determining whether a portion of the back-bet is going to be used to fund a second progressive prize pool (step 1516). In some embodiments, the second progressive prize pool may correspond to a back-bet progressive prize pool 324. If this query is answered positively, then the back-betting system 116 may determine the proportion or amount of the back-bet wager that should be applied to the second progressive prize pool (step 1520). This determination may depend upon whether some of the back-bet has already been used to fund the first progressive prize pool, an amount of the back-bet, an amount of the primary bet placed by the primary gambling player, etc.

Thereafter, the method continues by updating appropriate electronic records to reflect the allocation of the back-bet wager (step 1524). In some embodiments, where both queries 1508, 1516 were answered negatively, the electronic records that are updated may only correspond to records associated with normal back-bet wagers and not a back-bet wager associated with a progressive prize pool. In some embodiments, where both queries 1508, 1516 were answered positively, then multiple electronic records for the various progressive prize pools may be incremented by the amounts determined in steps 1512 and 1520. Of course, if only one of the queries 1508, 1516 were answered positively, then only select electronic records will be updated.

Figure 16:
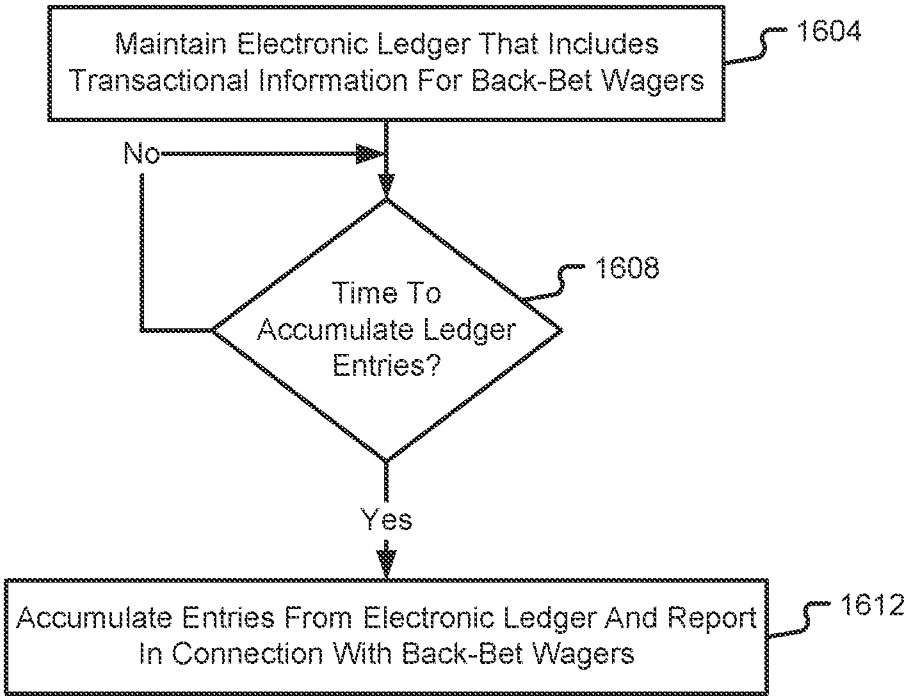
FIG. 16 is a flow diagram depicting another back-betting method in accordance with embodiments of the present disclosure.

With reference now to FIG. 16, another back-betting method will be described in accordance with at least some embodiments of the present disclosure. The method begins by maintaining an electronic ledger 148 that includes transactional information for back-bet wagers (step 1604). While the electronic ledger 148 is shown as being maintained in the back-betting system 116, it should be appreciated that the ledger 148 may also, or alternatively, be maintained within the wagering system 160.

The method may continue by determining whether or not to accumulate entries within the electronic ledger (step 1608). In some embodiments, the back-betting system 116 may accumulate entries on a periodic basis (e.g., after a predetermined amount of time has passed since a last accumulation) or in response to a predetermined number of entries being written since the last accumulation. Thus, the decision to accumulate entries within the electronic ledger 148 may be time based or event based. If it is not appropriate to accumulate ledger entries, then the method remains in a state of receiving and writing individual entries to the electronic ledger 148.

When the query of step 1608 is answered positively, the method continues with the back-betting system 116 accumulating the entries in the ledger 148 (step 1612). In some embodiments, the accumulated entries may be reported to a separate system, to an audit system, or to the wagering system 160 as appropriate.

Figure 17:
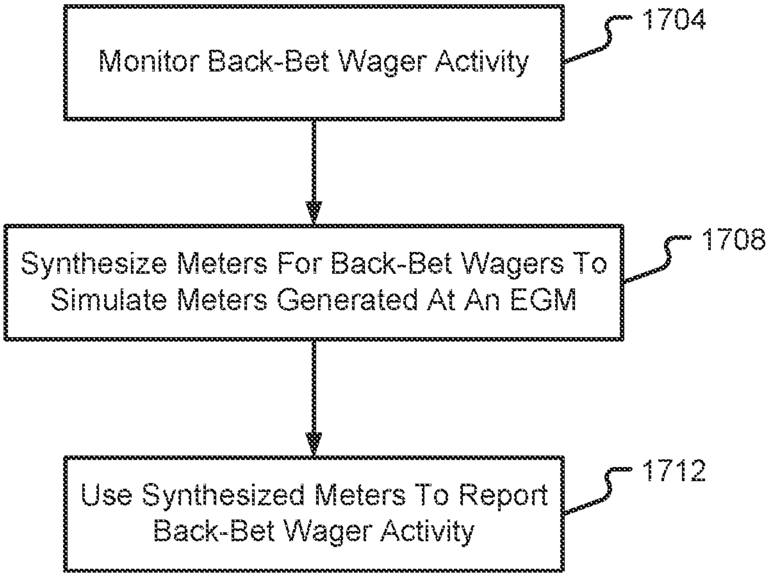
FIG. 17 is a flow diagram depicting another back-betting method in accordance with embodiments of the present disclosure.

With reference now to FIG. 17, another back-betting method will be described in accordance with at least some embodiments of the present disclosure. The method begins by monitoring back-betting wager activity (step 1704). This step may be performed at the back-betting system 116, at EGMs 108 involved in back-betting session, and/or at computational devices 152 involved in back-betting sessions.

The method continues by synthesizing one or more meters for the back-bet wagers (step 1708). In some embodiments, the one or more synthesized meters may correspond to a credit meter maintained in the back-betting system 116, in an EGM 108, in a computational device 152, or combinations thereof. The synthesized meters may be generated and maintained to simulate a credit meter normally generated and maintained at an EGM 108. Thus, the structure and organization of data within the synthesized credit meter(s) may be the same or identical to the structure and organization of data within traditional EGM credit meter(s).

In some embodiments, the synthesized meter(s) may be used to report back-bet wager activity (step 1712). For instance, the reporting of back-bet wagers placed, back-bet wagers won, and other events relevant to gaming reporting requirements may be reported with reference to the synthesized meter(s).

Figure 18:
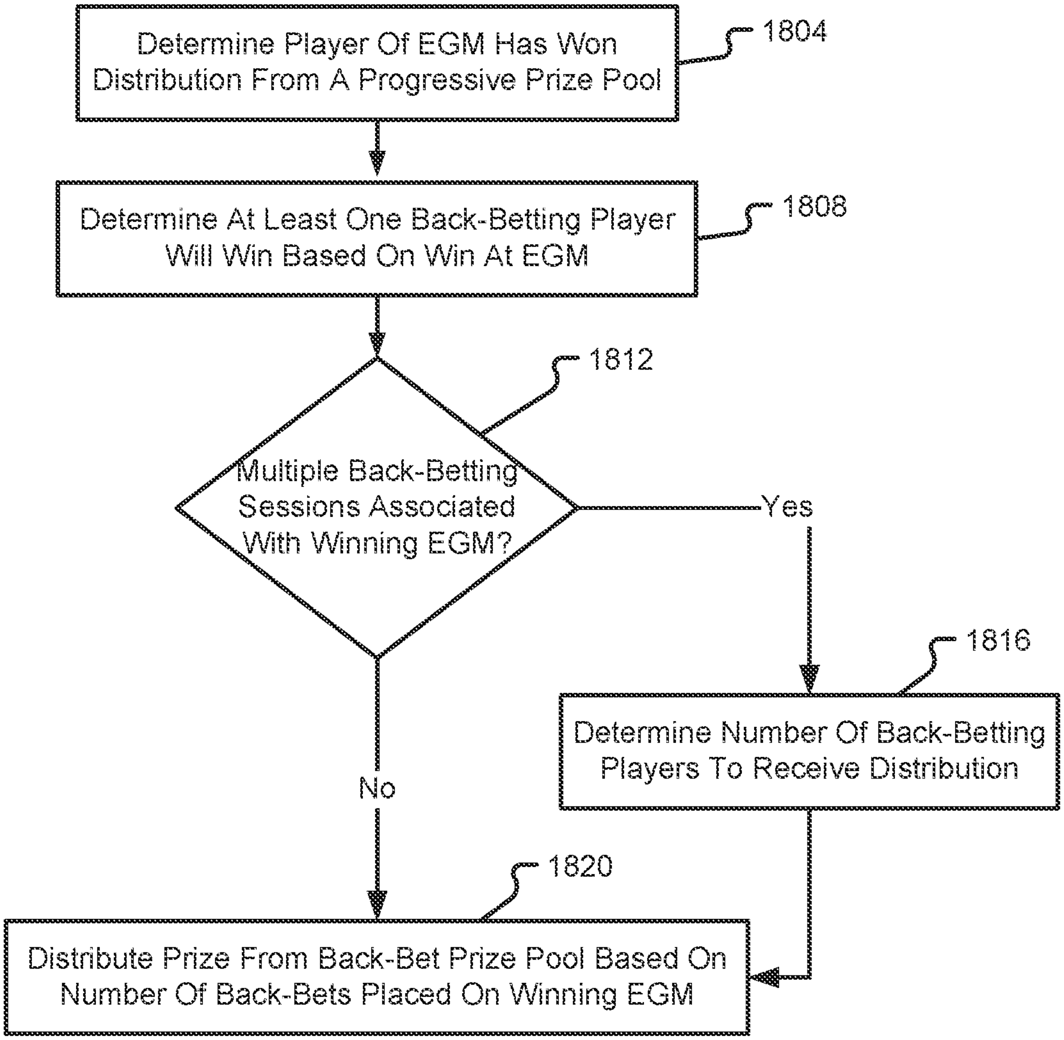
FIG. 18 is a flow diagram depicting another back-betting method in accordance with embodiments of the present disclosure.

With reference now to FIG. 18, another back-betting method will be described in accordance with at least some embodiments of the present disclosure. The method begins by determining that a primary gambling player of an EGM 108 has won a distribution from a progressive prize pool (step 1804). In some embodiments, the distribution may be made from the wagering prize pool 320 and the distribution may correspond to a fractional distribution from the pool 320 or a total distribution from the pool 320.

The method then continues by determining that at least one back-betting player has also won a back-betting wager based on the win at the EGM 108 (step 1808). This determination may be made at the back-betting system 116 based on knowledge that a back-betting player was involved in a back-betting session with the winning EGM 108 and a timely back-bet wager was placed during the back-betting session.

The method then continues by determining whether more than one winning back-betting sessions were associated with the winning EGM 108 (step 1812). In some embodiments, multiple winning back-bet wagers may have been placed by a single back-betting player or by multiple back-betting players. In some embodiments, a primary gambling player may also have placed a winning back-bet wager with their computational device 152 while they were simultaneously playing the EGM 108 directly.

If it is determined that multiple winning back-bets were placed on the winning EGM 108, then the method continues with the back-betting system 116 determining the number of back-betting players to receive a distribution from the back-bet prize pool 324 (step 1816). Thereafter, or in the event that the query of step 1812 is answered negatively, the method continues by distributing prize(s) or award(s) from the back-bet prize pool 324 based on the number of winning back-bets placed on the winning EGM 108 (step 1820). Of course, if the number of winning back-bets is equal to one, then the full award amount may be provided to the sole back-betting player. On the other hand, if the number of winning back-bets is greater than one, then the full award amount may be divided among the winning back-betting players. Such division of the award may depend upon the amount of the back-bet wager, the number of back-betting players, and so on.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A system comprising:

a communication interface that facilitates communications with a plurality of electronic gaming machines (EGMs) and with a plurality of user computational devices;

a processor coupled with the communication interface; and computer memory coupled with the processor and comprising processor-executable instructions that, when executed by the processor, cause the processor to:

manage a first prize pool based on a plurality of wagers placed at the plurality of EGMs for a game of chance or skill;

manage a second prize pool based on a plurality of back-bet wagers placed at the plurality of user computational devices for an outcome of the game of chance or skill;

establish at least a first electronic communication pathway through a communication network and at least a second electronic communication pathway through the communication network with the plurality of EGMs and with the plurality of user computational devices, respectively, wherein the first electronic communication pathway is different from the second electronic communication pathway;

distribute an award from the first prize pool in connection with the game of chance or skill to a player at one of the plurality of EGMs;

in response to distributing the award from the first prize pool, automatically distribute an award from the second prize pool to a player at one of the plurality of user computational devices; and transmit, via the at least a second electronic communication pathway, an electronic message indicating a re-assigned value reflecting the distribution of the award from the second prize pool.

2. The system of claim 1, wherein the first prize pool comprises a first progressive prize pool, wherein the second prize pool comprises a second progressive prize pool, wherein awards from the second progressive prize pool are conditioned upon distribution of awards from the first progressive prize pool, and wherein the first progressive prize pool is eligible to receive funding from the plurality of back-bet wagers.

3. The system of claim 1, wherein the award from the second prize pool is assigned to an electronic record associated with a user of a first user computational device among the plurality of user computational devices, wherein a wager in the plurality of wagers is placed by a user of a first EGM among a plurality of EGMs, and wherein the award is automatically re-assigned from the second prize pool in response to determining that the first user computational device is associated with the first EGM.

4. The system of claim 3, wherein the processor-executable instructions, when executed by the processor, further cause the processor to:

receive association information from the first user computational device that indicates the first user computational device is associated with the first EGM;

establish a back-betting session between a back-betting system and the first user computational device, wherein a duration of the back-betting session exists as long as the first user computational device is associated with the first EGM; and receive a first back-bet wager from the first user computational device over the duration of the back-betting session.

5. The system of claim 4, wherein the processor-executable instructions, when executed by the processor, further cause the processor to:

increment the first prize pool with at least a portion of the first back-bet wager.

6. The system of claim 4, wherein the processor-executable instructions, when executed by the processor, further cause the processor to:

receive additional association information from the first user computational device that indicates the first user computational device is associated with a second EGM among the plurality of EGMs;

establish a second back-betting session between the back-betting system and the first user computational device, wherein a duration of the second back-betting session exists as long as the first user computational device is paired with the second EGM; and receive a second back-bet wager from the first user computational device over the duration of the second back-betting session.

7. The system of claim 6, wherein the back-betting session and the second back-betting session coexist and wherein awards for the first back-bet wager and second back-bet wager are conditioned on the outcome of the game of chance or skill.

8. The system of claim 7, wherein the association information comprises an identifier of the first EGM and wherein the additional association information comprises an identifier of the second EGM.

9. The system of claim 7, wherein the first back-bet wager bypasses the first EGM and wherein the second back-bet wager bypasses the second EGM.

10. The system of claim 3, wherein the first user computational device is located remotely from the first EGM but is still associated with the first EGM.

11. The system of claim 3, wherein the first user computational device comprises a mobile device and wherein information regarding distribution of the award from the second prize pool is communicated to the mobile device via a mobile communication network.

12. The system of claim 1, wherein the first prize pool comprises a first progressive prize pool, wherein the second prize pool comprises a second progressive prize pool, and wherein an award from the second progressive prize pool is not distributed unless an award from the first progressive prize pool is distributed.

13. The system of claim 1, wherein the processor-executable instructions, when executed by the processor, further cause the processor to:

maintain an electronic ledger that includes transactional information for the plurality of back-bet wagers placed at the plurality of user computational devices; and accumulate entries from the electronic ledger on a periodic basis as a mechanism for reporting the plurality of back-bet wagers.

14. The system of claim 1, wherein the processor-executable instructions, when executed by the processor, further cause the processor to:

synthesize meters to simulate meters generated by a plurality of EGMs, wherein the synthesized meters reflect the plurality of back-bet wagers placed; and utilize the synthesized meters as a mechanism for reporting the plurality of back-bet wagers.

15. The system of claim 1, wherein the processor-executable instructions, when executed by the processor, further cause the processor to:

receive pairing information from a first user computational device among the plurality of user computational devices that indicates the first user computational device is paired with a first EGM among a plurality of EGMs;

receive pairing information from a second user computational device among the plurality of user computational devices that indicates the second user computational device is paired with the first EGM at substantially a same time that the first user computational device is paired with the first EGM;

determine that a wager was placed at the first EGM while both the first user computational device and the second user computational device were paired therewith; and divide distribution of the award from the second prize pool between a user of the first user computational device and a user of the second user computational device.

16. The system of claim 1, wherein the at least a first electronic communication pathway is used to exchange data representing the plurality of wagers placed at the plurality of EGMs for a game of chance or skill.

17. The system of claim 16, wherein the at least a first electronic communication pathway is established with a Slot Machine Interface Board (SMIB) of the one of the plurality of EGMs.

18. The system of claim 16, wherein the at least a second electronic communication pathway includes a wireless communication link established between the one of the plurality of EGMs and at least one of the plurality of user computational devices.

19. The system of claim 16, wherein the at least a first electronic communication pathway is established, at least in part, with a Virtual Private Network (VPN).

20. The system of claim 16, wherein the at least a second electronic communication pathway at least partially overlaps with the at least a first electronic communication pathway.

* * * * *